(12) United States Patent
Hamamura et al.

(10) Patent No.: US 7,650,171 B2
(45) Date of Patent: Jan. 19, 2010

(54) CELLULAR PHONE

(75) Inventors: Hiroyasu Hamamura, Higashihiroshima (JP); Yoshitaka Suzuki, Yao (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 250 days.

(21) Appl. No.: 11/580,825

(22) Filed: Oct. 16, 2006

(65) Prior Publication Data
US 2007/0032204 A1    Feb. 8, 2007

Related U.S. Application Data

(63) Continuation of application No. 10/681,277, filed on Oct. 9, 2003, now Pat. No. 7,346,376.

(30) Foreign Application Priority Data
Oct. 11, 2002   (JP) .............................. 2002-299430

(51) Int. Cl.
*H04M 1/00* (2006.01)
(52) U.S. Cl. ................. 455/575.1; 455/566; 455/550.1; 455/90.1
(58) Field of Classification Search .............. 455/575.1, 455/566, 550.1, 90.1
See application file for complete search history.

(56) References Cited

U.S. PATENT DOCUMENTS

| | | | |
|---|---|---|---|
| 5,719,799 | A | 2/1998 | Isashi et al. |
| 6,389,267 | B1 | 5/2002 | Imai et al. |
| 6,466,202 | B1 * | 10/2002 | Suso et al. ................. 345/169 |
| 6,539,243 | B1 | 3/2003 | Kimura et al. |
| 6,748,243 | B1 | 6/2004 | Kubo et al. |
| 6,782,281 | B1 | 8/2004 | Nagasawa et al. |
| 6,889,043 | B2 * | 5/2005 | Okazaki et al. .......... 455/435.1 |
| 6,907,276 | B2 | 6/2005 | Toba et al. |
| 6,944,481 | B2 | 9/2005 | Hama et al. |
| 2002/0030744 | A1 | 3/2002 | Sawachi |

(Continued)

FOREIGN PATENT DOCUMENTS

CN         1324169         11/2001

(Continued)

OTHER PUBLICATIONS

J-Phone—Announcement of J-SH52 and J-SA51 adapted to movie sha-mail, Keitai 24, ASCII Corporation, Aug. 30, 2002, pp. 1-5, URL http://k-tai.ascii24.com/k-tai/news/2002/08/30/638244-000.html.

(Continued)

*Primary Examiner*—Sanh D Phu
(74) *Attorney, Agent, or Firm*—Birch, Stewart, Kolasch & Birch, LLP

(57) ABSTRACT

A plurality of operation portions are arranged at a surface on a sub-display side of a cellular phone with a camera so that various kinds of setting, selection and control can be performed without opening the cellular phone in its folded state, and the cellular phone can achieve improved operability and convenience. Cellular phone includes a first display portion at a surface of a first body opposed to a second body in the folded state, and includes a second display portion, an image taking portion and a plurality of operation portions arranged at a rear surface of the first body remote from the first display portion.

29 Claims, 18 Drawing Sheets

U.S. PATENT DOCUMENTS

| | | |
|---|---|---|
| 2002/0031262 A1 | 3/2002 | Imagawa et al. |
| 2002/0039914 A1 | 4/2002 | Hama et al. |
| 2002/0045438 A1 | 4/2002 | Tagawa et al. |
| 2002/0142810 A1 | 10/2002 | Kawasaki et al. |
| 2003/0090438 A1 | 5/2003 | Sato et al. |

FOREIGN PATENT DOCUMENTS

| | | |
|---|---|---|
| CN | 1334485 A | 2/2002 |
| EP | 0534478 A | 3/1993 |
| EP | 0891050 | 1/1999 |
| EP | 0954150 | 11/1999 |
| EP | 1211869 A1 | 6/2002 |
| EP | 1244275 | 9/2002 |
| EP | 1 379 056 A2 | 1/2004 |
| EP | 1379062 A2 | 1/2004 |
| EP | 1 387 554 A1 | 2/2004 |
| GB | 2 344 260 A | 5/2000 |
| GB | 2347051 | 8/2000 |
| JP | 6292195 | 10/1994 |
| JP | 08-022343 | 1/1996 |
| JP | 8-294040 A | 11/1996 |
| JP | 11-215217 | 8/1999 |
| JP | 2000-115345 | 4/2000 |
| JP | 2000236376 | 8/2000 |
| JP | 2000-253113 A | 9/2000 |
| JP | 2001-8151 A | 1/2001 |
| JP | 2001-053875 | 2/2001 |
| JP | 2001-86475 A | 3/2001 |
| JP | 2001-136240 A | 5/2001 |
| JP | 2001-136251 | 5/2001 |
| JP | 3209150 | 9/2001 |
| JP | 2001-292359 A | 10/2001 |
| JP | 2001-313695 | 11/2001 |
| JP | 2002-33809 A | 1/2002 |
| JP | 2002-77341 A | 3/2002 |
| JP | 2002-101160 A | 4/2002 |
| JP | 2002-101171 A | 4/2002 |
| JP | 2002-111816 A | 4/2002 |
| JP | 2002-141997 A | 5/2002 |
| JP | 2002-185591 A | 6/2002 |
| JP | 2002-185599 A | 6/2002 |
| JP | 2002-204298 | 7/2002 |
| JP | 2002-232533 A | 8/2002 |
| JP | 2002-262164 A | 9/2002 |
| JP | 2002-271461 | 9/2002 |
| JP | 2002-281130 | 9/2002 |
| JP | 2002-290523 A | 10/2002 |
| KR | 2001-0091371 A | 10/2001 |

OTHER PUBLICATIONS

NTT DoCoMo Catalogue "SH251i", NTT DoCoMo Kyushu, Inc., May 2002, pp. 1-3.

DoCoMo, Mova SH251i, Pamphlet, Japan, Sharp Kabushiki Kaisha, May 31, 2002, May 2002 edition, pp. 1-6.

NTT DoCoMo, Mova D251i, User's Manual, Japan, NTT DoCoMo Group/Mitsubishi Electric Corporation, Jun. 30, 2002, First edition, cover, 6-7, 105-132, 327-366, back cover, and the like (Excerpt).

NTT DoCoMo, Mova SH251i, User's Manual, Japan, NTT DoCoMo Group/Sharp Kabushiki Kaisha, Jul. 31, 2002, First edition, Cover, pp. 6-11, 51, 115-163, 413, 417, Back cover and the like (Excerpt).

Ke-Tai Grand-Prix of 2001, Ranking for Each Carrier (Excerpt), Ke-Tai King, Japan, KK Best Sellers, Nov. 20, 2001, vol. 3, pp. 52-54.

DoCoMo, Mova SH251iS, Pamphlet, Japan, Sharp Kabushiki Kaisha, Nov. 30, 2002, Nov. 2002 edition, pp. 1-6.

DoCoMo, Move D251, Pamphlet, Japan, Mitsubishi Electric Corporation, Jul. 31, 2002, Jul. 2002 edition.

\* cited by examiner

FIG.9

| MODE | STATE | PRESSING TIME | 24b: 2nd OPERATION BUTTON | 23: SHUTTER BUTTON | 24a: 2nd OPERATION BUTTON |
|---|---|---|---|---|---|
| ORDINARY MODE | STANDBY | STANDARD | LIGHT ON | TO MENU SCREEN | PICT ON/OFF |
| | | LONG | LIGHT ON/OFF | ACTIVATE CAMERA | KEY LOCK |
| | MENU SCREEN | STANDARD | SELECT (BWD.) | DECIDE | SELECT (FWD.) |
| | WALLPAPER SETTING | STANDARD | DISPLAY OLD IMAGE (BWD.) | DECIDE → END DISPLAY | DISPLAY NEW IMAGE (FWD.) |
| | IMAGE CHECK | STANDARD | DISPLAY OLD IMAGE (BWD.) | END DISPLAY | DISPLAY NEW IMAGE (FWD.) |
| | LIGHT AMOUNT | STANDARD | DIM | DECIDE → END DISPLAY | BRIGHT |
| | | LONG | LIGHT OFF | – | – |
| | LIGHT COLOR | STANDARD | SELECT (BWD.) | DECIDE → END DISPLAY | SELECT (FWD.) |
| | | LONG | LIGHT OFF | – | – |
| | INCOMING CALL | STANDARD | OLD CALL (BWD.) | END DISPLAY | NEW INCOMING CALL (FWD.) |
| | MAIL ARRIVAL | STANDARD | OLD MAIL (BWD.) | DISPLAY MAIL DETAILS | NEW INCOMING MAIL (FWD.) |
| | | LONG | – | END DISPLAY | – |
| | TV CH SELECT | STANDARD | CH DOWN | CONTROL VOLUME | CH UP |
| | MP3 PLAY | STANDARD | BACKWARD | CONTROL VOLUME | FAST FWD. |
| | | LONG | PREVIOUS SONG | PLAY/STOP | NEXT SONG |
| | VOLUME | STANDARD | SMALL | CH SELECT/MP3 | UP |
| CAMERA MODE | STARTUP | STANDARD | LIGHT COLOR CHANGE | SHUTTER OPERATION | SET SELECTION |
| | | LONG | LIGHT ON/OFF | END CAMERA MODE | – |
| | AFTER-SHOOTING | STANDARD | IMAGE ERASING | SAVE | – |
| | SETTING SELECTION | STANDARD | – | DECIDE | – |
| | ZOOM CONTROL | STANDARD | ZOOM OUT | DECIDE → END DISPLAY | ZOOM IN |
| | BRIGHTNESS CONTROL | STANDARD | DIM | DECIDE → END DISPLAY | BRIGHT |
| | LIGHT AMOUNT | STANDARD | DIM | DECIDE → END DISPLAY | BRIGHT |
| | | LONG | LIGHT OFF | – | – |
| | LIGHT COLOR | STANDARD | SELECT (BWD.) | DECIDE → END DISPLAY | SELECT (FWD.) |
| | | LONG | LIGHT OFF | – | – |

FIG.15

| MODE | STATE | | 72e: LEFT BUTTON | 72a: DECISION BUTTON | 72d: RIGHT BUTTON |
|---|---|---|---|---|---|
| ORDINARY MODE | STANDBY | 72b ↑ UP/DOWN BUTTON ↓ 72c | KEY LOCK | - | PICT ON/OFF |
| | LIGHT | | OFF | - | ON |
| | WALLPAPER SETTING | | DISPLAY OLD IMAGE | DECIDE | DISPLAY NEW IMAGE |
| | IMAGE CHECK | | DISPLAY OLD IMAGE | END DISPLAY | DISPLAY NEW IMAGE |
| | LIGHT AMOUNT | | DIM | DECIDE | BRIGHT |
| | LIGHT COLOR | | SELECT (BWD.) | DECIDE | SELECT (FWD.) |
| | INCOMING CALL | | OLD CALL | END DISPLAY | NEW INCOMING CALL |
| | MAIL ARRIVAL | | OLD MAIL | DISPLAY MAIL DETAILS | NEW INCOMING MAIL |
| | TV CH SELECT | | CH DOWN | CONTROL VOLUME | CH UP |
| | MP3 PLAY | | BACKWARD | CONTROL VOLUME | FAST FWD. |
| | | | PREVIOUS SONG (LONG PRESS) | PLAY/STOP (LONG PRESS) | NEXT SONG (LONG PRESS) |
| | VOLUME | | SMALL | CH SELECT/MP3 PLAY | UP |
| | END SETTING | | - | END SETTING | - |
| CAMERA MODE | STARTUP | 72b ↑ UP/DOWN BUTTON ↓ 72c | - | SHUTTER OPERATION | - |
| | | | | END CAMERA MODE (LONG PRESS) | |
| | LIGHT | | OFF | - | ON |
| | ZOOM CONTROL | | ZOOM OUT | - | ZOOM IN |
| | BRIGHTNESS CONTROL | | DIM | - | BRIGHT |
| | LIGHT AMOUNT | | DIM | - | BRIGHT |
| | LIGHT COLOR | | SELECT (BWD.) | - | SELECT (FWD.) |

FIG.16

| MODE | STATE | | 72e: LEFT BUTTON | 72a: DECISION BUTTON | 72d: RIGHT BUTTON |
|---|---|---|---|---|---|
| ORDINARY MODE | STANDBY | 72b ↑ UP/DOWN BUTTON ↓ 72c | KEY LOCK | - | PICT. ON/OFF |
| | LIGHT | | OFF | - | ON |
| | WALLPAPER SETTING | | DISPLAY OLD IMAGE | DECIDE | DISPLAY NEW IMAGE |
| | IMAGE CHECK | | DISPLAY OLD IMAGE | END DISPLAY | DISPLAY NEW IMAGE |
| | LIGHT AMOUNT | | DIM | DECIDE | BRIGHT |
| | LIGHT COLOR | | SELECT (BWD.) | DECIDE | SELECT (FWD.) |
| | INCOMING CALL | | OLD CALL | END DISPLAY | NEW INCOMING CALL |
| MAIL DISPLAY MODE | | | OLD MAIL | DISPLAY MAIL DETAILS | NEW INCOMING MAIL |
| | | | UP BUTTON 72b: SCROLL DOWN | | DOWN BUTTON 72c: SCROLL UP |
| TV MODE | | | CH DOWN | - | CH UP |
| | | | UP BUTTON 72b: VOLUME UP | | DOWN BUTTON 72c: VOLUME DOWN |
| MP3 PLAY MODE | | | BACKWARD | PLAY/STOP (LONG PRESS) | FAST FWD. |
| | | | PREVIOUS SONG (LONG PRESS) | | NEXT SONG (LONG PRESS) |
| | | | UP BUTTON 72b: VOLUME UP | | DOWN BUTTON 72c: VOLUME DOWN |
| CAMERA MODE | STARTUP | 72b ↑ UP/DOWN BUTTON ↓ 72c | - | SHUTTER OPERATION / END CAMERA MODE (LONG PRESS) | - |
| | LIGHT | | OFF | - | ON |
| | ZOOM CONTROL | | ZOOM OUT | - | ZOOM IN |
| | BRIGHTNESS CONTROL | | DIM | - | BRIGHT |
| | LIGHT AMOUNT | | DIM | - | BRIGHT |
| | LIGHT COLOR | | SELECT (BWD.) | - | SELECT (FWD.) |

CELLULAR PHONE

This application is a Continuation of application Ser. No. 10/681,277 filed on Oct. 9, 2003 now U.S. Pat. No. 7,346,376, and for which priority is claimed under 35 U.S.C. § 120; and this application claims priority of Application No. 2002-299430 filed in Japan on Oct. 11, 2002 under 35 U.S.C. § 119; the entire contents of all are hereby incorporated by reference.

BACKGROUND OF THE INVENTION

1. Field of the Invention

The present invention relates to a cellular phone having a function of taking pictures.

2. Description of the Background Art

In recent years, cellular phones have been widely used. Shapes of such cellular phones can be roughly divided into three types, i.e., a straight type, a flip type and a clamshell type. Among them, the cellular phone of the clamshell type can be small in size when it is folded so that the needs for it are higher than those for the other types.

Recently, such a cellular phone has been proposed that is provided with a liquid crystal sub-display on a rear surface remote from a main liquid crystal display, and also a cellular phone having a camera function has been proposed.

FIG. 17 is a perspective view showing an external appearance of a conventional clamshell-type cellular phone 100 with a camera (Model Name: SH251i, Manufacturer: Sharp Kabushiki Kaisha, released on Jun. 1, 2002). Cellular phone 100 includes a first body 101 and a second body 102. First body 101 and second body 102 are coupled together via a hinge 103, and can be mutually turnable around hinge 103 to provide a foldable structure. As shown in FIG. 17, cellular phone 100 is provided at first body 101 with a first display portion 104. First display portion 104 is arranged such that first display portion 104 is located inside cellular phone 100 in the folded state. First display portion 104 (i.e., main display) comprises a liquid crystal display or an EL display, and displays an image based on image data, which is sent via a first display driver portion arranged within the body. Cellular phone 100 is provided at its rear surface of first body 101 with an antenna portion 105 and a helical portion 106. Cellular phone 100 is provided at a side surface of first body 101 with a second shutter button 107 for a camera function. Cellular phone 100 is further provided at its upper portion with a first loud speaker 108, which is used for telephone conversation.

An open/close detector 109 is a detecting portion for detecting whether cellular phone 100 is in a folded state or not. A small projection 109a is formed at a lower portion of first body 101 near hinge 103, and a small aperture 109b is formed at an upper portion of second body 102 near hinge 103. A detection switch (not shown) is arranged within aperture 109b. Open/close detector 109 includes projection 109a, aperture 109b and the detection switch. When cellular phone 100 is folded, projection 109a on first body 101 enters aperture 109b at second body 102, and thereby activates the detection switch (not shown) so that a control portion arranged within the body determines that cellular phone 100 is folded.

Description will now be given on second body 102 of conventional cellular phone 100. An input button portion 110 includes keys for entering numbers and letters. A function button group 111 is a group of buttons for achieving various kinds of setting and function selection in the cellular phone. A power button 112 for power-on/off, a first shutter button 113 for a camera function, which will be described later, a mail/guidance button 114 for a mail function and guidance display, a start and speaker-receive button 115 for starting a call and speaker-receiving, and a multi-guide button 116 formed of a four-way button and a decision button, which are used for performing up/down and right/left selection as well as decision on a function selecting screen. Second body 102 is provided at its lower portion with a conversation microphone 117.

In the conventional cellular phone, hinge 103, function button group 111, input button group 110 and conversation microphone 117 are successively arranged on second body 102.

FIG. 18 is a perspective view showing an outer appearance of a rear side of cellular phone 100 shown in FIG. 17. FIG. 19 is a perspective view showing an outer appearance of cellular phone 100 in a folded state. FIG. 20 is a side view showing an outer appearance of cellular phone 100 in the folded state. First body 101 is provided at its rear surface with a second display portion 120, a camera portion 121, a light portion 122 and antenna portion 105 already described.

Second display portion 120 is arranged to occupy an outside position when cellular phone 100 is in the folded state. Second display portion 120 (sub-display) comprises a liquid crystal display or an EL display. Second display portion 120 displays images based on image data sent via a second display driver portion arranged in the body.

Camera portion 121 includes imaging lenses, an imaging element such as a CCD (Charge Coupled Device) image sensor or a CMOS (Complementary Metal Oxide Semiconductor) image sensor, and RGB (i.e., tricolor) color filters. In camera portion 121, the color filters produce tricolor light of RGB from the light, which are reflected by a subject and are transmitted through the imaging lenses. As shown in FIG. 18, camera portion 121 is arranged to occupy an outside position when cellular phone 100 is in the folded state.

Light portion 122 is used as an auxiliary light source when taking images by camera portion 121. In general, many kinds of conventional auxiliary light sources employ xenon tubes. In recent times, however, some kinds of auxiliary light sources employ red, green and blue LEDs, which are simultaneously turned on to emit while light.

Second body 102 is provided at its rear surface with a battery portion 123 for holding a battery and a second speaker 124 for playing a ringing tone.

Referring to FIGS. 21A and 21B, description will now be given on a manner of taking pictures by conventional cellular phone 100. FIG. 21A shows a general manner of taking a picture of a subject. A photographer opens cellular phone 100, directs camera portion 121 to the subject, and uses first display portion 104 as a finder. FIG. 21B shows a general manner, in which the photographer takes a picture of the photographer himself. In this case, the photographer uses second display portion 120 as a finder so that the photographer can take a picture while viewing a picture to be taken. In general, many cellular phones are configured to display a mirror image on second display portion 120 by laterally inverting an original image for preventing unnatural feeling. As shown in FIG. 21A, the photographer can use either first shutter button 113 or second shutter button 107, which is arranged on a side surface of first body 101. As shown in FIG. 21B, the photographer takes a picture by operating second shutter button 107 on cellular phone 100 in the folded state. However, a picture can be taken even by cellular phone 100 in an open state. In the open state, the photographer can operate second shutter button 107 arranged on the side surface of first body 101.

Even in the clamshell-type cellular phone with the camera, which has the two display portions as described above, it is still necessary or desirable to improve the cellular phone for effective use of the sub-display by the user.

When the clambshell-type cellular phone is in the folded state, an input portion is not available to the user except for shutter button 107 arranged on the side surface of first body 101. In a camera mode, sub-display 120 is used merely as a finder. In a standby mode, sub-display 120 displays a standby screen, a clock, mail arrival and others. However, these are merely items or matters, which were preset for automatic display on sub-display 120 by the user operating the cellular phone in the open state.

Accordingly, when the photographer intends, e.g., to control an amount of light from light portion 122, which is arranged beside camera portion 121, in a camera mode, it is necessary to open the cellular phone and to operate keys on second body 102 while viewing a controlled amount of light, which is displayed on main display 104. Likewise, for setting the standby screen or the clock display, the photographer is required to open the cellular phone and to perform such setting while viewing main display 104. Further, when sub-display 120 displays arrival of a mail, the photographer is required to open the cellular phone and to view main display 104 for reading contents of the mail. As described above, the display is located on the outer surface of the cellular phone in the folded state, but the operation of such display can be performed only after opening the cellular phone, which is a troublesome operation for the user.

The direction of the body of the cellular phone in the folded state is inverted from that in the open state. When the user changes the state of cellular phone, e.g., from the folded state to the open state, the user must change the direction or position of the cellular phone on the user's hand.

SUMMARY OF THE INVENTION

Accordingly, a feature of the invention is to provide a cellular phone, which allows effective and easy use of a sub-display by a user.

In summary, a first embodiment of the invention provides a cellular phone including a first body, a second body and a coupling portion coupling the first body and second body together, and allowing folding of the first body and second body with respect to each other.

The cellular phone also includes a first display portion arranged on a surface of the first body opposed to the second body in the folded state.

The cellular phone is further provided at a rear surface of the first body remote from the first display portion with a second display portion, an image taking portion and a plurality of operation portions for use in the folded state of the cellular phone.

According to an embodiment of the invention, the second display portion and the plurality of operation portions, which are used when the cellular phone is in the folded state, are arranged on the outside of the cellular phone in the folded state. Thereby, even when the cellular phone is in the folded state, a user can perform various kinds of selection such as selection of image taking functions and selection of display on the second display portion as well as various kinds of changes or the like of control magnitudes.

As described above, the user can operate the plurality of operation portions available on the folded cellular phone without opening the cellular phone, and thereby can perform selection of various functions such as activation of a camera, turn-on of a light and selection of pictograph display as well as change of control magnitudes such as intensity and amount of light. Accordingly, the user using the cellular phone in the closed state can perform the selection or change of control magnitudes without opening the cellular phone, which improves operability and convenience.

Preferably, the second display portion displays an image taken by the image-taking portion.

According to an embodiment of the invention, since the second display portion can display the image taken by the image taking portion, control of shooting conditions and processing of taken images can be performed by operating the above operating portions. Since the user can perform the control of shooting conditions and the processing of taken images without opening the cellular phone in the folded state, the operability and convenience are improved.

Preferably, one of the operation portions is a shutter button.

According to an embodiment of the invention, since one of the operation portions is a shutter button, the user can operate the shutter button to perform a shooting operation. Accordingly, the user can take a picture by the folded cellular phone without opening it, which improves the operability and convenience.

Preferably, the operation portion is a control button for controlling shooting conditions.

According to an embodiment of the invention, since the operation portion is the control button for controlling the shooting conditions, the user can operate the operation portion to control the shooting conditions. Therefore, the user can control the shooting conditions without opening the folded cellular phone. This improves the operability and convenience.

Preferably, the operation portion is an operation button for operating display by the second display portion.

According to an embodiment of the invention, since the operation portion is the operation button for operating the display by the second display portion, the user can operate the operation portion to operate the display by the second display portion. Therefore, the user can operate the display by the second display portion without opening the folded cellular phone. This improves the operability and convenience.

Preferably, the operation portion functions as a control button and an operation button.

According to an embodiment of the invention, since the operation portion works as the control button and the operation button, the user can operate the operation portion to control the shooting conditions and to operate the display by the second display portion. Accordingly, it is not necessary to arrange a control button for controlling the shooting conditions and an operation button for operating display by the second display portion at different positions on the rear surface of the cellular phone, respectively, and it is merely required to arrange a button functioning as both the buttons.

As described above, the button functioning as both the control button and the operation button can reduce the sizes and the number of parts of the cellular phone, and thereby can reduce a cost. In many cases, the control button and the operation button are generally used as a "+" button (i.e., forward button) and a "−" button (backward button), which can be operated in a similar manner, so that the dual- or multi-purpose button facilitates the operation by the user, and improves the operability and convenience.

Preferably, the cellular phone further includes an illumination portion located on the same surface as the image taking portion. When the operation portion is pressed for a short time, the illumination portion emits light only during the pressing. When the operation portion is continuously pressed for a time longer than a predetermined time, the illumination portion changes its mode into a continuous-on mode.

According to an embodiment of the invention, when the operation portion is pressed for a short time, the illumination portion emits light only during the pressing. When it is continuously pressed for a long time, the illumination portion changes its state to a continuous-on state. Accordingly, the user can select the on states of the illumination portion by pressing the operation portion for a short time or a long time. This improves the operability and convenience. Different kinds of control can be selected in accordance with the short press and long press, and thus it is not necessary to increase the number of operation buttons so that it is possible to suppress the increase in cost due to increase in size and number of parts of the cellular phone.

Preferably, the cellular phone further includes an illumination portion emitting light in a variable light color and arranged on the same surface as the image taking portion. When the operation portion is pressed for a short time, the light color changes. When the operation portion is continuously pressed for a time longer than a predetermined time, the illumination portion changes its mode into a continuous-on mode.

According to an embodiment of the invention, when the user presses the operation portion for a short time, the light color changes. When the user presses it for a long time, the mode changes its mode into the continuous-on mode. Therefore, selection of the light color of the illumination portion and the on/off of the illumination portion can be selectively achieved in accordance with the short press and long press of the operation portion. This improves the operability and convenience. Further, by selecting the control in accordance with the short press and long press, multiple kinds of control can be achieved without increasing the number of operation buttons so that it is possible to suppress the increase in cost due to increase in size and number of parts of the cellular phone.

Preferably, the cellular phone includes an illumination portion and an illumination light amount control portion. The operation portion is a light amount control button for controlling an amount of light of the illumination portion.

According to an embodiment of the invention, the operation portion is the light amount control button for controlling the amount of light of the illumination portion. Therefore, the user can control the amount of light by operating the light amount control button. Accordingly, the user can control the amount of light of the illumination portion on the folded cellular phone without opening it, which improves the operability and convenience.

Preferably, the cellular phone further includes an illumination portion formed of a plurality of LEDs of different colors, and a light color changing portion changing the LEDs emitting light in the illumination portion. The operation portions are light color changing buttons for changing the light color of the illumination portion.

According to an embodiment of the invention, since the operation portion is the light color changing button for changing the light color of the illumination portion, the user can change the light color by operating the light color changing button. Accordingly, the user can change the light color of the illumination portion on the folded cellular phone without opening it. This improves the operability and convenience.

Preferably, the cellular phone further includes an incoming call record storing portion storing an incoming call record. The operation portion changes the incoming call record displayed on the second display portion to another incoming call record.

According to an embodiment of the invention, the user can change the incoming call record displayed on the second display portion to another incoming call record. Therefore, the user can change the incoming call record displayed on the second display portion without opening the folded cellular phone. This improves the operability and convenience.

Preferably, the cellular phone further includes a control portion for displaying contents of a received mail on the second display portion. The operation portion selects and displays contents of another received mail.

According to an embodiment of the invention, the operation portion can be operated to select and display contents of another received mail. Therefore, the user can change the received mail, of which contents are displayed on the second display portion, without opening the cellular phone in the folded state. This improves the operability and convenience.

Preferably, the cellular phone further includes an antenna receiving television broadcast waves, a television tuner and a television signal processing portion. The second display portion displays video signals subjected to signal processing by the television signal processing portion. The operation portion is a channel selector button for changing a receive frequency of the television broadcast wave.

According to an embodiment of the invention, the second display portion displays the video signal subjected to the signal processing by the television signal processing portion. The operation portion is the channel selector button for changing the receive frequency of the television broadcast wave. Therefore, a user can select the receive channel by operating the operation portion.

Thereby, even when the user watches television on the second display portion, the user is not required to open the cellular phone and to operate numeric buttons or the like for changing the channel, and the user can change the channel while keeping the folded state. This improves the operability and convenience.

Preferably, the cellular phone further includes an audio data storing portion for storing audio data, and an audio reproduction portion for reproducing the audio data. The operation portion can be operated to reproduce the audio data in the audio data storing portion.

According to an embodiment of the invention, the operation portion can be operated to reproduce the audio data in the audio data storing portion. Accordingly, the user can operate the cellular phone in the folded state to reproduce the audio data without opening it.

Thereby, when the user listens to the audio data by the cellular phone, the user can change songs or tunes to be reproduced without opening the cellular phone for operating the numeric buttons or the like. This improves the operability and convenience.

Preferably, the cellular phone further includes a speaker. The operation portion is a volume button for controlling a volume of the speaker.

According to an embodiment of the invention, since the operation portion is the volume button for controlling the volume of the speaker, the user can control the volume of the speaker by the operation portion. Accordingly, the user can operate the cellular phone in the folded state to control the volume without opening it.

Thereby, when the user listens to the audio data by the cellular phone, the user can change the volume while keeping the cellular phone in the folded state, and is not required to open the cellular phone for operating the numeric buttons or the like. This improves the operability and convenience.

Preferably, the plurality of operation portions include a control item selecting portion and a control magnitude selecting portion.

According to an embodiment of the invention, the second display portion as well as the control item selecting portion and the control magnitude selecting portion are arranged on the outside of the cellular phone in the folded state. Thereby, even when the cellular phone is in the folded state, the user can perform selection of various kinds of items such as selection of shooting functions and selection of display by the second display portion, changing of various kinds of control magnitudes and the others.

As described above, the user can operate the control item selecting portion without opening the cellular phone, and thereby the user can select the control items, e.g., for control of light amount and brightness, and can change the control magnitudes. Accordingly, the user is not required to open the cellular phone for controlling the functions, of which control magnitudes can be changed in the closed state. This improves the operability and convenience.

Preferably, the second display portion displays contents of a received mail. The plurality of operation portions include a scroll button for longitudinally or laterally scrolling the contents of the mail displayed on the second display portion, and a selector button for selecting and displaying contents of another received mail.

According to an embodiment of the invention, the cellular phone is provided at the rear surface of the first body remote from the first display portion with the second display portion capable of display of contents of the received mail, the image taking portion, the scroll button allowing longitudinal and lateral scrolling of the contents of the mail displayed on the second display portion, and the selector button for selecting and displaying contents of another received mail. Thereby, even when the cellular phone is in the folded state, the user can display the mail on the second display portion, and can perform scrolling of the mail and switching to another mail.

Thereby, the user can read a body of the mail by checking and displaying the mail while keeping the cellular phone in the folded state, and the user is not required to open the cellular phone for reading the mail on the first display portion and for selecting the mail to be read with numerical buttons or the like. This improves the operability and convenience.

Preferably, the cellular phone further includes an antenna, a television tuner and a television signal processing portion. The second display portion displays television pictures. The plurality of operation portions include a channel button for selecting television signal waves displayed by the second display portion, and a volume button for controlling a sound volume.

According to an embodiment of the invention, the cellular phone includes the antenna, the television tuner and the television signal processing portion, and is provided at the rear surface of the first body remote from first display portion with the second display portion capable of display of television pictures, the image taking portion, the channel button for selecting the television signal waves displayed on the second display portion, and the volume button for controlling the sound volume. Therefore, even when the cellular phone is in the folded state, the second display portion can display television pictures, and the user can select or change the channel and volume with the channel button and the volume button, respectively. This improves the operability and convenience.

Preferably, the cellular phone further includes an audio data storing portion for storing audio data, and a reproducing portion for reproducing the audio data.

The plurality of operation portions include a reproduction operation portion for operating reproduction of the audio data, and a volume button for controlling a sound volume.

According to an embodiment of the invention, the cellular phone includes the audio data storing portion for storing audio data, and the reproducing portion for reproducing the audio data, and is provided at the rear surface of the first body remote from the first display portion with the second display portion, the image taking portion, the reproduction operation portion for operating the reproduction of the audio data and the volume button for controlling the sound volume. Therefore, even when the cellular phone is in the folded state, the user can reproduce and/or record the audio data by operating the reproduction operating portion and the volume control portion. This improves the operability and convenience.

Preferably, the second display portion visually displays a control magnitude changeable by a user.

According to an embodiment of the invention, the second display portion visually displays the control magnitudes changed by the user. Accordingly, the user is not required to open the cellular phone, and can perform various kinds of control while visually checking the control magnitude displayed on the second display portion of the folded cellular phone.

Preferably, the plurality of operation portions attain a control mode to control shooting conditions in a camera shooting mode.

According to an embodiment of the invention, the camera shooting mode includes the control mode for controlling the shooting conditions with the plurality of operation portions. Therefore, the user can control brightness, light amount and/or light color in the camera shooting mode while viewing the second display portion of the cellular phone in the folded state, and thereby can take pictures under the good conditions thus controlled. Since the cellular phone can be operated while keeping the folded state, this improves the operability and convenience.

Preferably, the plurality of operation portions attain a processing mode to process taken images before saving the images in a camera shooting mode.

According to an embodiment of the invention, the camera shooting mode of the cellular phone includes the processing mode for processing taken images with the plurality of operation portions before saving the images. Accordingly, in the camera shooting mode of the cellular phone, which is in the folded state, the user can process the taken images by operating the plurality of operation portions before saving the images, while viewing the second display portion.

Preferably, the plurality of operation portions include a first decision button, a second decision button and a third decision button.

According to an embodiment of the invention, the plurality of operation portions include the first decision button, the second decision button and the third decision button. By using the three buttons, therefore, the user can perform, e.g., selection of the shooting functions and selection of the display on the second display portion, and thus can perform various kinds of selection, changing of various control magnitudes and others.

Preferably, the plurality of operation portions include a decision button, a right button and a left button.

According to an embodiment of the invention, the plurality of operation portions include the decision button, the left button and the right button. By using these buttons, therefore, the user can perform, e.g., selection of the shooting functions and selection of the display on the second display portion, and thus can perform various kinds of selection, changing of various control magnitudes and others.

Preferably, the plurality of operation portions include a first decision button, a second decision button, a third decision button, a fourth decision button and a fifth decision button.

According to an embodiment of the invention, the plurality of operation portions include the first decision button, the second decision button, the third decision button, the fourth decision button and the fifth decision button. By using the five buttons, therefore, the user can perform, e.g., selection of the shooting functions and selection of the display on the second display portion, and thus can perform various kinds of selection, changing of various control magnitudes and others.

Preferably, the plurality of operation portions include a decision button, an up button, a down button, a right button and a left button.

According to an embodiment of the invention, the plurality of operation portions include the decision button, the up button, the down button, the right button and the left button. By using these buttons, therefore, the user can perform, e.g., selection of the shooting functions and selection of the display on the second display portion, and thus can perform various kinds of selection, changing of various control magnitudes and others.

Preferably, the image taking portion, the second display portion and the plurality of operation portions are arranged at the rear surface of the first body remote from the first display portion, and are located in the order of the image taking portion, the second display portion and the plurality of operation portions starting from a position near the coupling portion.

According to an embodiment of the invention, the second display portion is arranged between the image taking portion and the operation portions (e.g., buttons) so that a certain distance is kept between the image taking portion and the operation portions. Thereby, such a situation can be prevented that the user accidentally covers the image taking portion with a user's hand, which is moved for pressing a button, in a shooting operation. Therefore, the user can operate the respective buttons without giving attention to the position of the image taking portion when performing various kinds of setting for shooting such as zoom setting. This improves the operability and convenience, and can prevent such a situation that the user touches the image taking portion with a finger to scratch parts such as a lens or to cause adhesion of dust. Consequently, the durability of the cellular phone can be improved, and the performance thereof can be maintained.

Preferably, the cellular phone further includes a plurality of numeric buttons and a plurality of operation buttons arranged on a surface of the second body opposed to the first body in the folded state.

According to an embodiment of the invention, the cellular phone in the folded state includes the plurality of numeric buttons and the plurality of operation buttons located on the surface of the second body opposed to the first body in the folded state, and includes the second display portion, the image taking portion and the plurality of operation portions located on the rear surface of the first body remote from the first display portion. Therefore, when the user keeps the cellular phone in the folded state, the plurality of numeric buttons and operation buttons are directed in the same direction as the plurality of operation portions.

Thereby, the body surface provided with the buttons is directed toward the user even when the user merely opens the cellular phone after the user operated the cellular phone in the folded state. Therefore, the user can smoothly operate the cellular phone without changing its position or direction on the user's hand.

According to an embodiment of the invention, the second display portion and the plurality of operation portions, which are used when the cellular phone is in the folded state, are arranged on the outside of the cellular phone in the folded state. Thereby, even when the cellular phone is kept in the folded state, the user can perform selection of various functions of such as selection of image taking functions and selection of display on the second display portion.

Without opening the cellular phone, as described above, the user can operate the operation portions to select a plurality of functions such as activation of the camera, turn-on of the light and selection of pictograph display. Accordingly, the functions, which can be selected in the closed state of the cellular phone, can be achieved without opening the cellular phone so that the operability and convenience are improved.

According to an embodiment of the invention, since the second display portion can display an image taken by the image taking portion, the user can operate the operation portions to control the shooting conditions and to process the taken images. Therefore, the user can control the shooting conditions and can process the taken images without opening the cellular phone in the folded state. This improves the operability and convenience.

According to an embodiment of the invention, since one of the operation portions is the shutter button, the user can perform the shooting operation by operating the shutter button thus formed. Therefore, the user can take a picture by the cellular phone in the folded state without opening it. Since the second display portion and the shutter button are located on the same surface, the user can easily operate the shutter button to take a picture. This improves the operability and convenience.

According to an embodiment of the invention, the operation portion is the control button for controlling the shooting conditions. Therefore, the user can control the shooting conditions by manipulating the operation portion. Accordingly, the user can control the shooting conditions without opening the cellular phone in the folded state. This improves the operability and convenience.

According to an embodiment of the invention, the operation portion is the operation button for operating the display by the second display portion. Therefore, the user can operate the operation portion to operate the display by the second display portion. Accordingly, the user can operate the display by the second display portion without opening the cellular phone in the folded state. This improves the operability and convenience.

According to an embodiment of the invention, since the operation portion functions as the control button and the operation button, the user can manipulate the operation portion to control the shooting conditions and to operate the display by the second display portion. Accordingly, it is not necessary to arrange a control button for controlling the shooting conditions and an operation button for operating display by the second display portion at different positions on the rear surface of the cellular phone, respectively, and it is merely required to arrange a button serving as both the buttons.

As described above, the button serving as both the control button and the operation button can reduce the sizes and the number of parts of the cellular phone, and thereby can reduce a cost. In many cases, the control button and the operation button are generally used as a "+" button (i.e., forward button) and a "−" button (backward button), which can be operated in a similar manner. Therefore, the dual- or multi-purpose button described above facilitates the operation by the user, as compared with the case employing independent buttons. Accordingly, the operability and convenience are improved.

According to an embodiment of the invention, when the user presses the operation portion for a short time, the illumination portion emits light only during the pressing. When the user continuously presses the operation portion for a long time, the illumination portion changes its state to a continuous-on state. Accordingly, the user can select the state of the illumination portion by pressing the operation portion for either a short time or a long time. This improves the operability and convenience. Since different kinds of control can be selected in accordance with the short press and long press, and thus it is not necessary to increase the number of buttons. Therefore, it is possible to suppress the increase in cost due to increase in size and number of parts of the cellular phone.

According to an embodiment of the invention, when the user presses the operation portion for a short time, the illumination portion changes its light color. When the user presses it for a long time, the illumination portion changes its mode into the continuous-on mode. Therefore, the user can selectively achieve the selection of the light color of the illumination portion and turn-on/off of the illumination portion in accordance with either the short press or long press of the operation portion. This improves the operability and convenience. Further, by selecting the control in accordance with either the short press or long press, multiple kinds of control can be achieved without increasing the number of operation buttons so that it is possible to suppress the increase in cost due to increase in size and number of parts of the cellular phone.

According to an embodiment of the invention, the operation portion is the light amount control button for controlling the amount of light of the illumination portion. Therefore, the user can control the amount of light by operating the light amount control button. Accordingly, the user can control the amount of light of the illumination portion on the folded cellular phone without opening it. This improves the operability and convenience.

According to an embodiment of the invention, since the operation portion is the light color changing button for changing the light color of the illumination portion, the user can change the light color by operating the light color changing button. Accordingly, the user can change the light color of the illumination portion on the folded cellular phone without opening it. This improves the operability and convenience.

According to an embodiment of the invention, the user can change the incoming call record displayed on the second display portion to another incoming call record. Therefore, the user can change the incoming call record displayed on the second display portion without opening the folded cellular phone. This improves the operability and convenience.

According to an embodiment of the invention, the operation portion can be operated to select and display contents of another received mail. Therefore, the user can change the received mail, of which contents are displayed on the second display portion, without opening the cellular phone in the folded state. This improves the operability and convenience.

According to an embodiment of the invention, the second display portion displays the video signal subjected to the signal processing by the television signal processing portion. The operation portion is the channel selector button for changing the receive frequency of the television broadcast wave. Therefore, the user can select the receive channel by manipulating the operation portion.

Thereby, even when the user watches television on the second display portion, the user is not required to open the cellular phone and to operate numeric buttons or the like for changing the channel, and the user can change the channel while keeping the folded state. Consequently, the operability and convenience are improved.

According to an embodiment of the invention, the operation portion can be operated to reproduce the audio data in the audio data storing portion. Accordingly, the user can operate the cellular phone in the folded state to reproduce the audio data without opening it.

Thereby, when the user listens to the audio data by the cellular phone, the user can change songs or tunes to be reproduced without opening the cellular phone for operating the numeric buttons or the like. This improves the operability and convenience.

According to an embodiment of the invention, since the operation portion is the volume button for controlling the volume of the speaker, the user can control the volume of the speaker by the operation portion. Accordingly, the user can operate the cellular phone in the folded state to control the volume without opening it.

Thereby, when the user listens to the audio data by the cellular phone, the user can change the volume while keeping the cellular phone in the folded state, and is not required to open the cellular phone for operating the numeric buttons or the like. This improves the operability and convenience.

According to an embodiment of the invention, the cellular phone includes the second display portion, the control item selecting portion and the control magnitude selecting portion arranged on the outside of the cellular phone in the folded state. Thereby, even when the cellular phone is in the folded state, the user can perform selection of various kinds of items such as selection of shooting functions and display by the second display portion, changing of various kinds of control magnitudes and the others.

Without opening the cellular phone, as described above, the user can operate the control item selecting portion to select the control items, e.g., for control of light amount and brightness, and can operate the control magnitude selecting portion to change the control magnitudes. Since the selection of the control items is independent of the selection of the control magnitudes, the user can easily operate them. The selection of the control items and the change of the control magnitudes can be performed while keeping the cellular phone in the closed state, and it is not necessary to open the cellular phone for such operations. This improves the operability and convenience.

According to an embodiment of the invention, since the second display portion displays the image taken by the image taking portion, the user can perform various kinds of control while viewing the image, which is taken by the cellular phone and is displayed on the second display portion. Thereby, even when the cellular phone is in the folded state, the user can perform the selection of various control items, change of control magnitudes, processing and others for the images taken by the image taking portion. This improves the operability and convenience.

According to an embodiment of the invention, the cellular phone is provided at the rear surface of the first body remote from the first display portion with the second display portion capable of display of contents of the received mail, the image taking portion, the scroll button allowing longitudinal and lateral scrolling of the contents of the mail displayed on the second display portion, and the selector button for selecting and displaying contents of another received mail. Thereby, even when the cellular phone is in the folded state, the user can display the mail on the second display portion, and can perform scrolling of the mail and switching to another mail.

Thereby, the user can read a body of the mail by checking and displaying the mail on the second display portion while keeping the cellular phone in the folded state, and the user is not required to open the cellular phone for reading the mail on the first display portion and for selecting the mail to be read with numerical buttons or the like. This improves the operability and convenience.

According to an embodiment of the invention, the cellular phone includes the antenna, the television tuner and the television signal processing portion, and is provided at the rear surface of the first body remote from first display portion with the second display portion capable of display of television pictures, the image taking portion, the channel button for selecting the television signal waves displayed on the second display portion, and the volume button for controlling the sound volume. Therefore, even when the cellular phone is in the folded state, the second display portion can display television pictures, and the user can select or change the channel and volume with the channel button and the volume button, respectively. This improves the operability and convenience.

According to an embodiment of the invention, the cellular phone includes the audio data storing portion for storing the audio data, and the reproducing portion for reproducing the audio data, and is provided at the rear surface of the first body remote from the first display portion with the second display portion, the image taking portion, the reproduction operation portion for operating the reproduction of the audio data and the volume button for controlling the sound volume. Therefore, even when the cellular phone is in the folded state, the user can reproduce and/or record the audio data by operating the reproduction operating portion and the volume control portion. This improves the operability and convenience.

According to an embodiment of the invention, the second display portion visually displays the control magnitudes changed by the user. Accordingly, the user is not required to open the cellular phone, and can perform various kinds of control while visually checking the control magnitude displayed on the second display portion of the folded cellular phone. As described above, the second display portion visually displaying the control magnitudes and the operation portion are arranged on the same surface so that the user can manipulate the operation portion while viewing the control magnitude on the cellular phone kept in the folded state.

According to an embodiment of the invention, the camera shooting mode of the cellular phone includes the control mode for controlling the shooting conditions with the plurality of operation portions. Therefore, the user can control brightness, light amount and/or light color in the camera shooting mode while viewing the second display portion of the cellular phone in the folded state, and thereby can take pictures under the good conditions thus controlled. Since the user can operate the cellular phone while keeping it in the folded state, this improves the operability and convenience.

According to an embodiment of the invention, the camera shooting mode of the cellular phone includes the processing mode for processing taken images with the plurality of operation portions before saving the images. Accordingly, in the camera shooting mode of the cellular phone, which is in the folded state, the user can process the taken images by operating the plurality of operation portions before saving the images, while viewing the second display portion.

As described above, the user can process the image while viewing the second display portion, before the image taken by the user is saved. Thereby, the cellular phone can save the image, which is subjected to the image control and processing by the user. Accordingly, when the user intends to control and/or process the taken image immediately after the shooting, such an operation is not required that the image already saved is read for the image control and/or processing so that the operability and convenience are improved.

According to an embodiment of the invention, the plurality of operation portions include the first button, the second button and the third decision button. Thereby, the user can perform, e.g., selection of the shooting functions and selection of the display on the second display portion on the cellular phone in the folded state, and thus can perform selection of various functions.

Without opening the cellular phone, as described above, the user can operate the first to third decision buttons to select a plurality of functions such as activation of the camera, turn-on of the light and selection of pictograph display. Accordingly, the functions, which can be selected in the closed state of the cellular phone, can be achieved without opening the cellular phone so that the operability and convenience are improved.

According to an embodiment of the invention, the plurality of operation portions include the decision button, the right button and the left button. Therefore, the user can change the control magnitude by using the right and left buttons when controlling the shooting conditions or selecting the display setting of the second display portion even when the cellular phone is in the folded state.

Without opening the cellular phone, the user can perform selection of setting and change of the control magnitude by pressing the decision button as well as the right and left buttons. Accordingly, the functions, in which control magnitudes can be changed in the closed state of the cellular phone, can be achieved without opening the cellular phone so that the operability and convenience are improved.

According to an embodiment of the invention, the plurality of operation portions include the first decision button, the second decision button, the third decision button, the fourth decision button and the fifth decision button. Thereby, the user can perform, e.g., selection of the shooting functions and selection of the display on the second display portion, and thus can perform selection of various functions even when the cellular phone is in the folded state.

As described above, by pressing the first decision button, the second decision button, the third decision button, the fourth decision button and the fifth decision button, the user can select various functions without opening the cellular phone, and more specifically can perform selection of a menu mode, setting of the key-locked state, turn-on/off of the light, activation of the camera, turn-on of the light, selection of the pictograph display and others. Therefore, the functions, which can be selected in the closed state of the cellular phone, can be achieved without opening the cellular phone so that the operability and convenience are improved.

According to an embodiment of the invention, the plurality of operation portions include the decision button, the up button, the down button, the left button and the right button. Thereby, even when the cellular phone is in the folded state, the user can control the shooting conditions, and can set the display by the second display portion in such a manner that the control items are selected with the up button and the down button, the control magnitude is changed with the right button and the left button, and the change thus made is decided with the decision button.

As described above, the user can press the up or down button, the right or left button and the decision button without opening the cellular phone, and thereby can select items for control or setting, can change the control magnitude and can fix the change. Accordingly, the functions, in which the control magnitude can be changed in the closed state of the cellular phone, can be achieved without opening the cellular phone so that the operability and convenience are improved. Since the button for selecting the setting items is independent of the button for changing the control magnitude, this facilities the setting operation by the user.

According to an embodiment of the invention, the second display portion is arranged between the image taking portion and the buttons so that a certain distance is kept between the image taking portion and each button. Thereby, such a situation can be prevented that a user accidentally covers the image taking portion with the user's hand, which is moved for pressing a button, in the shooting operation. Therefore, the user can operate the respective buttons without giving attention to the position of the image taking portion when performing various kinds of setting for shooting such as zoom setting. This improves the operability and convenience. Further, such a situation can be prevented that the user touches the image taking portion with his/her finger to scratch parts such as a lens or to cause adhesion of dust. Consequently, the durability of the cellular phone can be improved, and the performance thereof can be maintained.

According to an embodiment of the invention, the cellular phone in the folded state includes the plurality of numeric buttons and the plurality of operation buttons located on the surface of the second body opposed to the first body in the folded state, and includes the second display portion, the image taking portion and the plurality of operation portions located on the rear surface of the first body remote from the first display portion. Therefore, when the user keeps the cellular phone in the folded state, the plurality of numeric buttons and operation buttons are directed in the same direction as the plurality of operation portions.

Thereby, the body surface provided with the buttons is directed toward the user even when the user merely opens the cellular phone after the user operated the cellular phone in the folded state. Therefore, the user can smoothly operate the cellular phone without changing its position or direction on the user's hand.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 9 is a table illustrating allocation of button operations of the cellular phone according to the embodiment.

FIG. 15 is a table illustrating allocation of button operations of another cellular phone according to the embodiment.

FIG. 16 is a table illustrating allocation of button operations of still another cellular phone according to the embodiment.

DESCRIPTION OF THE PREFERRED EMBODIMENTS

Figure 1:
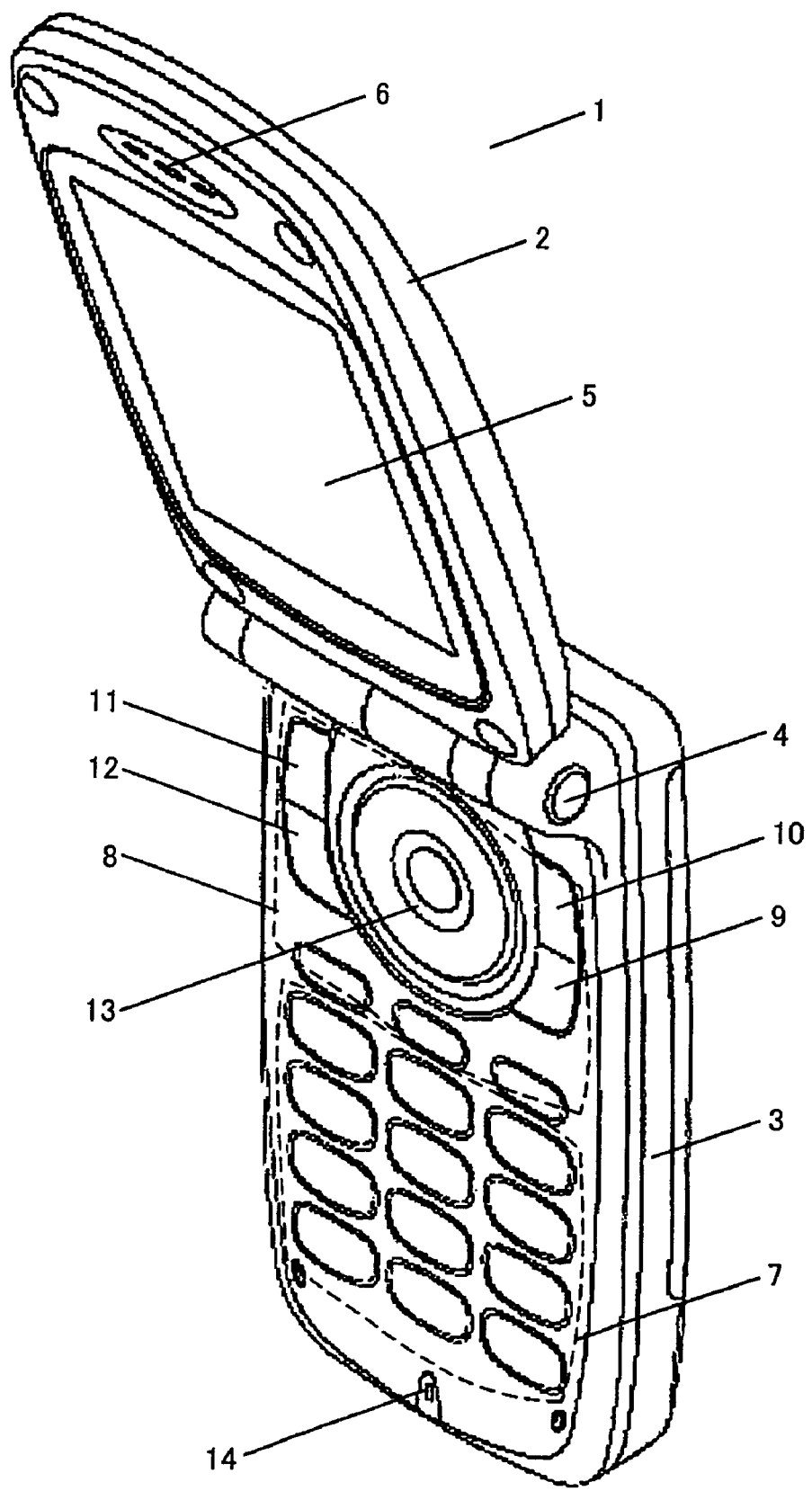
FIG. 1 is a perspective view showing an outer appearance of a cellular phone according to an embodiment.
Figure 3:
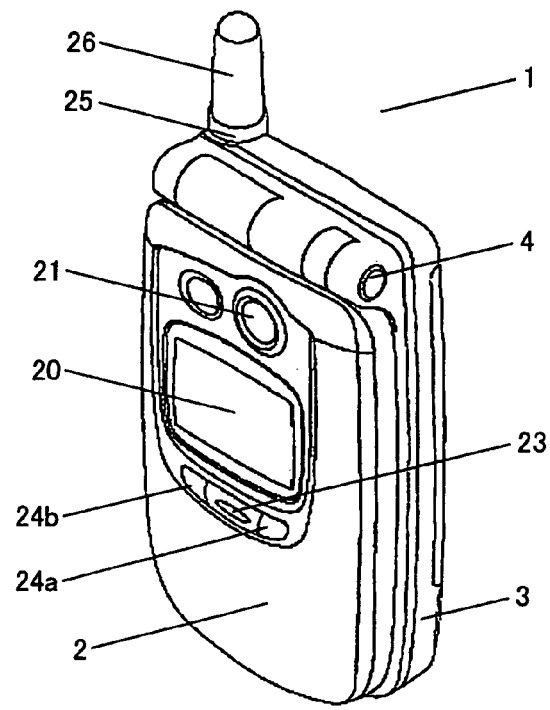
FIG. 3 is a perspective view showing an outer appearance of the folded cellular phone according to an embodiment.

Embodiments of the invention will now be described with reference to the drawings. FIG. 1 is a perspective view showing an outer appearance of a cellular phone 1 of a clamshell type provided with a camera according to an embodiment of the invention. Cellular phone 1 comprises a first body 2 and a second body 3. First body 2 is coupled to second body 3 via a hinge 4. First body 2 and second body 3 are rotatable around hinge 4, and thus provide a foldable structure as shown in FIG. 3.

Referring to FIG. 1, cellular phone 1 comprises first body 2 with a first display portion 5. First display portion 5 is arranged to occupy an inside position when cellular phone 1 is in the folded state. First display portion 5 comprises a liquid crystal display, an EL (Electro Luminescent) display or the like. First display portion 5 displays an image based on image data provided via a first display driver portion 43, which will be described later. A speaker 6 is arranged above first display portion 5 for use in telephone conversation and others.

Description will now be given on second body 3 of cellular phone of an embodiment of the invention. Second body 3 comprises an input button group 7 formed of keys or the like to be used for entering numbers, letters and others, a function button group 8 for performing various kinds of setting and function selection in cellular phone 1, a power button 9 for power-on/off, a first shutter button 10 to be operated for enabling a shutter function, a mail/guidance button 11 for selecting a mail function and performing guidance display, a start/speaker-conversation button 12 for starting a call and performing conversation via the speaker, and a multi-guide button 13 having a four-way button and a decision button for performing longitudinal and lateral selection on a function select screen and for deciding the selection. These buttons can be operated by a user. Further, second body 3 is provided at its lower portion with a microphone 14.

Usually, hinge 4, function button group 8, input button group 7 and conversation microphone 14 are arranged in this order on second body 3 of cellular phone 1. However, the order is not restricted to the above.

Figure 2:
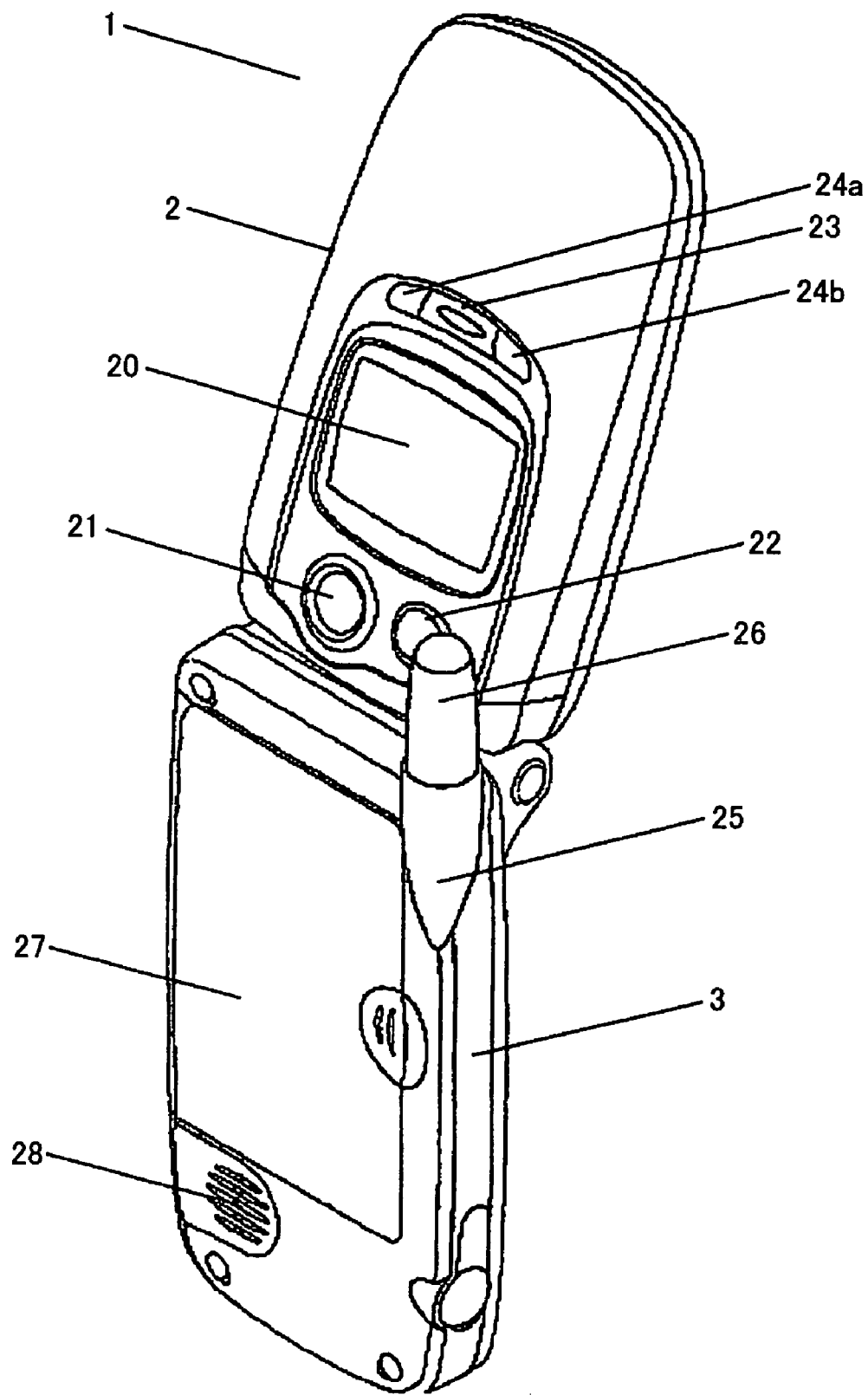
FIG. 2 is a perspective rear view showing an outer appearance of the cellular phone according to the embodiment.

As shown in FIGS. 2 and 3, first body 2 is provided at its rear surface remote from first display portion 5 with a camera portion 21 and a light portion 22, which are close to hinge 4, and is also provided at the rear surface with a second display portion 20 spaced from hinge 4 as well as a second shutter button 23 and second operation buttons 24a and 24b, which are further spaced from hinge 4.

Second display portion 20 is arranged to occupy an outside position on the body of cellular phone 1 in the folded state. The second display portion 20 comprises a liquid crystal display, an EL display or the like. In this embodiment, second display portion 20 has a display region smaller than that of first display portion 5. However, the display region of second display portion 20 may be larger than or equal to that of first display portion 5. Second display portion 20 displays images based on image data, which is obtained by photographing and is provided via a second display driver portion 44 to be described later, and also displays images based on data of character images for informing the user of a time, a radio wave intensity, a mail reception and others.

As described above, each of first display portion 5 and second display portion 20 is arranged at the surface of first body 2 or second body 3, which is exposed externally in the open or unfolded state, with the display screen directed externally. In particular, second display portion 20 is arranged at the surface, which is exposed externally, of first body 2 or second body 3 in the folded state such that second display portion 20 is directed externally in the folded state.

For displaying images, second display driver portion 44 sends the image data to second display portion 20, and the image based on the image data is displayed such that an upper side of the image is located near hinge 4. Since second display portion 20 displays the image such that the upper side thereof is located near hinge 4, the user using cellular phone 1 in the folded state locates hinge 4 in the upper position so that the direction of second body 3 does not change when the user changes the state of cellular phone 1 between the open state and the closed state. In other words, the user is not required to change the direction or position of cellular phone 1 on the user's hand each time the user opens or closes cellular phone 1. Consequently, operability and convenience are improved. The images displayed on second display portion 20 include images taken or obtained by shooting. Therefore, the user can view such taken images without the necessity of changing the direction or position of cellular phone 1 on the user's hand. This improves the operability and convenience.

As described below, the antenna is arranged in a position other than a conventional position, i.e., a position on a rear surface of first body 2. This eliminates or reduces restrictions on the rear surface of first body 2 so that second display portion 20 can be larger in size than that of a conventional structure. Accordingly, it can display a larger amount of information such as text and taken images. Further, cellular phone 1 includes a second operation button group 24. Therefore, even when cellular phone 1 is in the closed state, the user can operate cellular phone 1 to display various images on second display portion 20 for checking contents of mails, referring to an address book or successively displaying a plurality of images. The images displayed on second display portion 20 include taken images, i.e., images taken by shooting operations. Even when cellular phone 1 is in the folded state, the user can check the taken image on the large screen of second display portion 20. Therefore, the user is not required to open or close cellular phone 1 for viewing the taken image, which improves the operability and convenience.

Camera portion 21 includes picture taking lenses, a picture taking element such as a CCD (Charge Coupled Device) image sensor or a CMOS (Complementary Metal Oxide Semiconductor) image sensor, and RGB (i.e., red, green and blue) color filters. For the sake of simplicity, it is assumed that camera portion 21 in this embodiment has a CCD image sensor 29, which will be merely referred to as "CCD 29" hereinafter, as the image taking element. In camera portion 21, the light reflected by a subject passes through the picture taking lenses, and is converted by the color filters into RGB light rays, which enter CCD 29. As shown in FIG. 3, when cellular phone 1 is in the folded state, camera portion 21 arranged on the rear surface remote from first display portion 5 is located between hinge 4 and second display portion 20. For taking a picture by camera portion 21 while keeping cellular phone 1 in the open state, the user holds second body 3.

Owing to the above arrangement, camera portion 21 is located near hinge 4. When the user holds first body 2, the user supports a portion near camera portion 21 so that it is possible to reduce an influence, which may be caused by unstable holding with the user's hand during a shooting operation. Further, the antenna is removed from the rear surface of first body 2 so that second display portion 20 can have a large size. When shooting a subject, the user can easily check a self-portrait on a large screen while suppressing an influence by unstable holding.

Light portion 22 is used as an auxiliary light source for taking a picture by camera portion 21. In general, xenon lamps have been often used as auxiliary light sources. However, RGB LEDs (Light Emitting Diodes) are currently used in some cases. Cellular phone 1 may employ such LEDs, and the LEDs can be simultaneously turned on to provide white light illumination.

Second shutter button 23 is arranged at a center of the rear surface remote from first display portion 5 of first body 2, and is located under second display portion 20 when cellular phone 1 is in the folded state as shown in FIG. 3. Owing to this position of second shutter button 23, the user can easily determine the position of shutter button 23 on folded cellular phone 1, and can easily operate the shutter.

In a conventional structure, a user must find a shutter button, which is hard to find due to its small size and its position, e.g., on a side surface of a first body. However, the embodiment does not require such a finding operation. Therefore, the operability and convenience are improved.

Second operation buttons 24a and 24b are arranged on the opposite sides of second shutter button 23 for setting or operating various kinds of data while checking information displayed on second display portion 20. By arranging second operation button group 24 in this position, the user can easily determine the positions of second operation buttons 24a and 24b on cellular phone 1 in the folded state, and can easily operate second operation buttons 24a and 24b.

Second shutter button 23 and second operation buttons 24a and 24b are utilized as operation buttons to be operated by the user for turning on/off various functions and determining decision and end of specific operations. In cellular phone 1 of an embodiment of the invention, these buttons can be utilized, e.g., for activating the light, turning on/off the light, selecting menu screens, turning on/off pictograph display, activating the camera, turning on/off key-lock, deciding selection, ending display, displaying mail body, selecting control items, playing and stopping MP3, and changing the light color.

Second operation buttons 24a and 24b can be utilized as control buttons, which are operated by the user to achieve changing (e.g., up/down and forward/backward) of control magnitudes of various functions. In cellular phone 1 of an embodiment of the invention, buttons 24a and 24b are utilized to perform, for example, selection and forward/backward changes on a menu screen, forward/backward change of various display images, up/down of light amount, forward/backward change of light color, forward/backward change of the incoming call record, incoming mail record and others, up/down of the TV channel, selection of backward/forward and next/previous in MP3 play, volume up/down, and zoom-in/out in zoom control. Second operation buttons 24a and 24b are control buttons, and primarily have functions as plus- and minus-buttons for various kinds of control magnitudes. In this embodiment, second shutter button 23 is not utilized as a control button. However, this is not restrictive, and second shutter button 23 may be utilized similarly.

As described above, the user can use second shutter button 23 and second operation buttons 24a and 24b without opening cellular phone 1, and thereby can perform the selection of a plurality of functions such as activation of the camera, turn-on of the light or change of pictograph display as well as the change of control magnitudes. Accordingly, it is not necessary to open cellular phone 1 for executing the functions, which can be changed on cellular phone 1 in the closed state, so that operability and convenience are improved.

Further, second display portion 20 can display images taken by camera portion 21. Therefore, the user can control shooting conditions and can process taken images by operating second shutter button 23 and second operation buttons 24a and 24b. Accordingly, the user can control the shooting conditions and can process the taken images on folded cellular phone 1 without opening it so that the operability and convenience are improved.

By employing the buttons serving as both the operation buttons and the control buttons, it is possible to reduce the sizes and the number of parts of cellular phone 1, and thereby can reduce the cost. The control button and the operation button are generally used as a "+" button (i.e., forward button) and a "−" button (backward button) in many cases, and can be operated in a similar manner so that the dual- or multi-purpose buttons are preferable. Thereby, the user can easily operate cellular phone 1 so that the operability and convenience are improved.

An antenna portion 25, an extendable helical portion 26, a battery portion 27 for carrying a battery and a second speaker 28 for sounding a ringer toner are arranged at the rear surface of second body 3 remote from input button group 7 and function button group 8.

Figure 4:
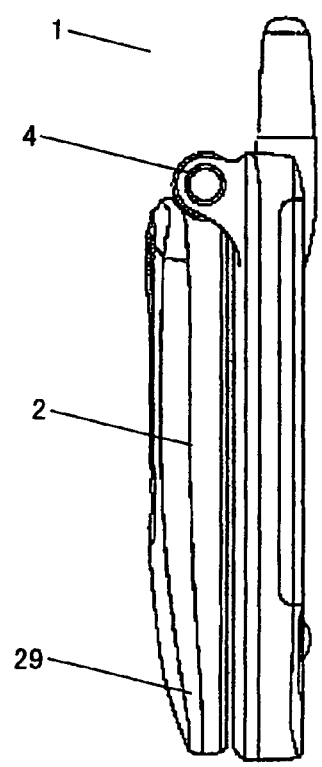
FIG. 4 is a side view showing an outer appearance of the folded cellular phone according to an embodiment.

Referring to FIGS. 3 and 4, first body 2 is mechanically coupled to second body 3 via hinge 4. A flexible circuit board (not shown) is arranged within hinge 4 for electrically connecting first body 2 and second body 3 together. A connector is arranged in a portion of first body 2 near hinge 4 for connecting the flexible circuit board and cables to several substrates arranged within first body 2. The thickness of this connector affects the thickness of first body 2 more significantly than the others. Meanwhile, the thickness of camera portion 21 is smaller than that of the connector. Therefore, even if camera portion 21 is arranged near the connector, it does not affect the thickness of first body 2. In a conventional cellular phone, a camera portion is arranged near an end (lower end in FIG. 3) of first body 2 so that the thickness of the camera portion determines the thickness of the portion near the end of first body 2 except for the antenna portion. However, camera portion 21 is arranged between antenna portion 25 and second display portion 20 and thus near hinge 4 so that the central portion of first body 2 can ensure the thickness of second display portion 20, and the thickness and other sizes can be further reduced in the portion of first body 2 near its end. As shown in FIG. 4, the thickness of first body 2 curvedly decreases as the position moves from a central portion toward the end portion. Owing to this configuration or form, in which the thickness is reduced in the portion of first body 2 near its end, and thus in the lower portion of cellular phone 1 in the folded state, the user can easily put cellular phone 1, e.g., into a pocket so that the operability and convenience are improved.

Since second display portion 20 is arranged between camera portion 21 and second shutter button 23 or second operation buttons 24a and 24b, camera portion 21 can be spaced by a constant distance from second shutter button 23 or second operation buttons 24a and 24b. Thereby, such a situation can be prevented that a user accidentally touches camera portion 21 or covers a sight of camera portion 21 with the user's finger when the user manipulates second shutter button 23 or second operation buttons 24a and 24b. Thus, it is possible to prevent such a situation that the user touches camera portion 21 with a finger to scratch parts such as a lens or to cause adhesion of dust. Consequently, the durability of the cellular phone can be improved, and the performance thereof can be maintained.

Further, cellular phone 1 is configured such that the user can hold folded cellular phone 1 with hinge 4 located in the upper position so that the user holding folded cellular phone 1 does not cover camera portion 21 with the user's hand. Therefore, the user can hold cellular phone 1 without giving attention to the position of camera portion 21.

Figure 5A:
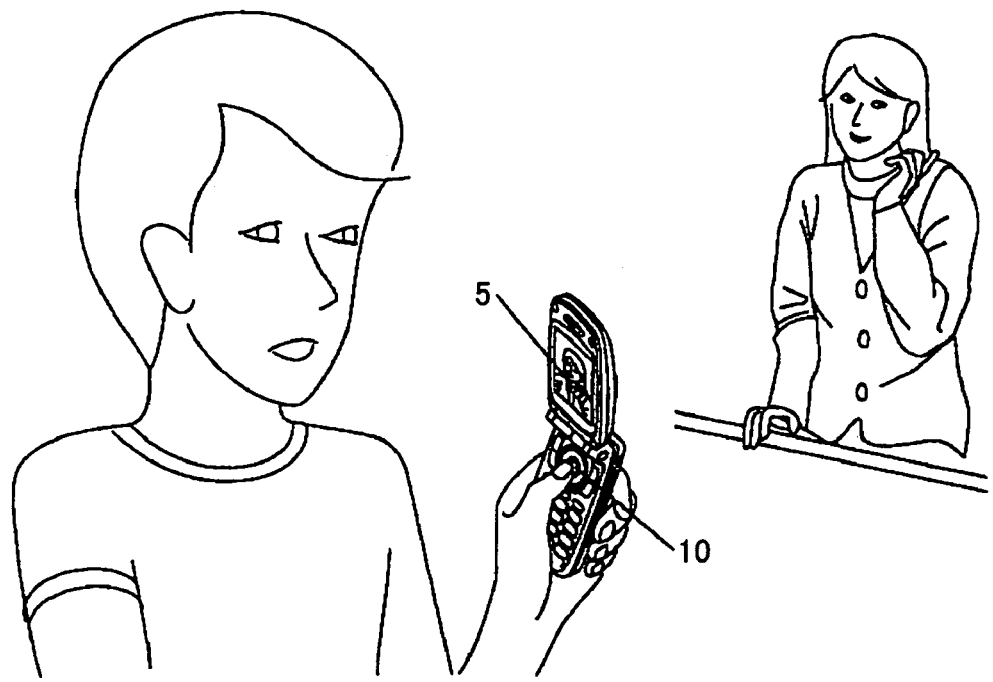
FIGS. 5A and 5B illustrate a manner of using the cellular phone according to the embodiment.
Figure 5B:
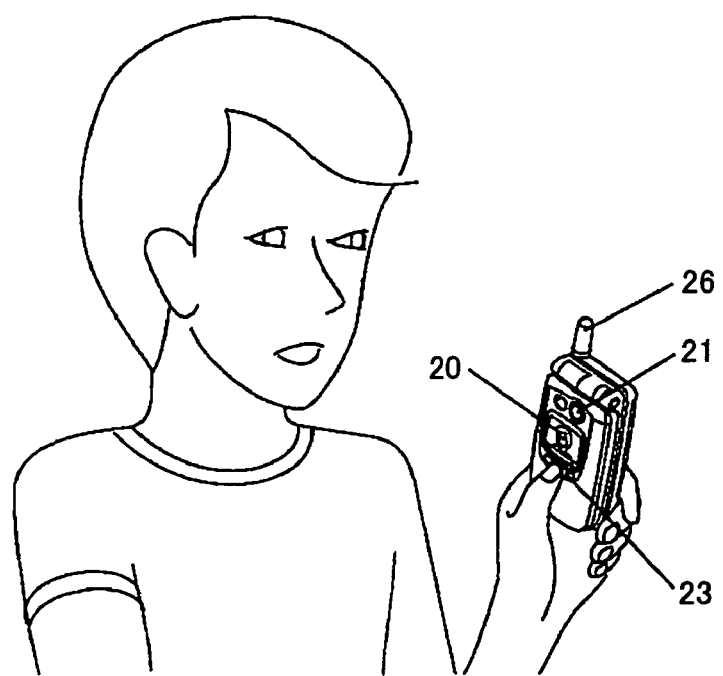

Manners of taking a picture by cellular phone 1 according to the embodiment of the invention will now be described with reference to FIGS. 5A and 5B. In a general manner of taking a picture of a subject 30 shown in FIG. 5A, the user opens cellular phone 1, and directs camera portion 21 to subject 30 for taking a picture while using first display portion 5 as a finder. Although first shutter button 10 is generally used for operating the shutter, second shutter button 23 arranged on the rear surface of first body 2 can be used. FIG. 5B shows a general manner of taking a picture of the user himself by camera portion 21. In this manner, the user uses second display portion 20 as a finder, and can operate the shutter by pressing second shutter button 23 while viewing an obtained image of the user himself.

In general, when a cellular phone displays an image on second display portion 20, it displays a mirror image, i.e., a laterally inverted image so that the user may not feel unnatural when viewing the image. In the invention, however, the manner is not restricted to this. According to the embodiment of the invention, the user can take a picture of the user himself/herself by cellular phone 1 in the folded state, which improves operability and usability. The state of cellular phone 1 for taking a picture of the user is not restricted to the folded state, and the user can take a picture by cellular phone 1 in the open state.

The buttons are arranged at the same surfaces of first body 2 and second body 3 of cellular phone 1 in the folded state. Therefore, when the user opens and operates cellular phone 1 after operating it in the folded state, and vice versa, the user can execute an entry operation via buttons immediately after opening or closing first body 2 while continuously holding second body 3. Thus, the user can smoothly operate cellular phone 1 without changing its position on the hand.

Figure 6:
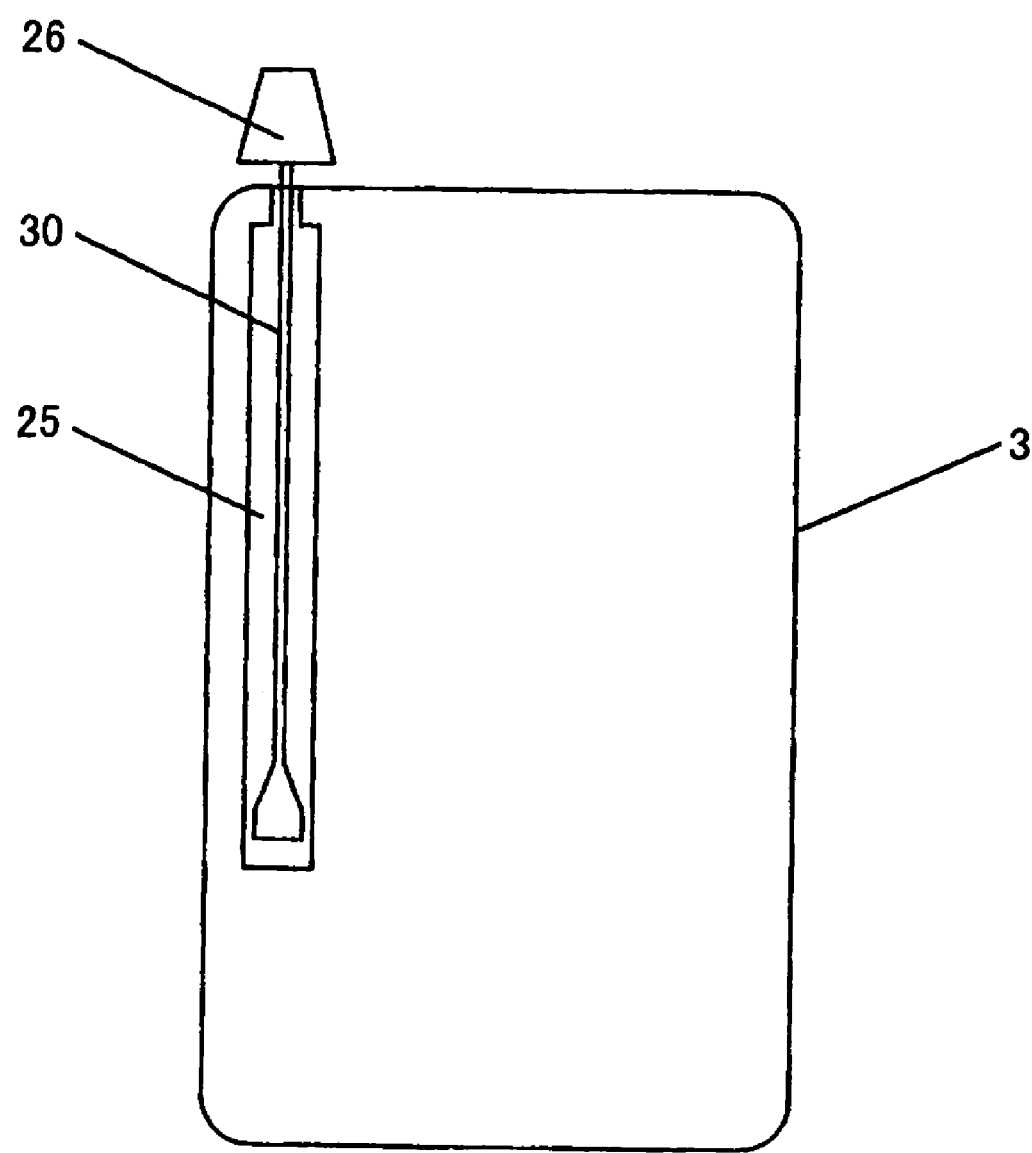
FIG. 6 is a cross section of the cellular phone according to the embodiment.
Figure 7A:
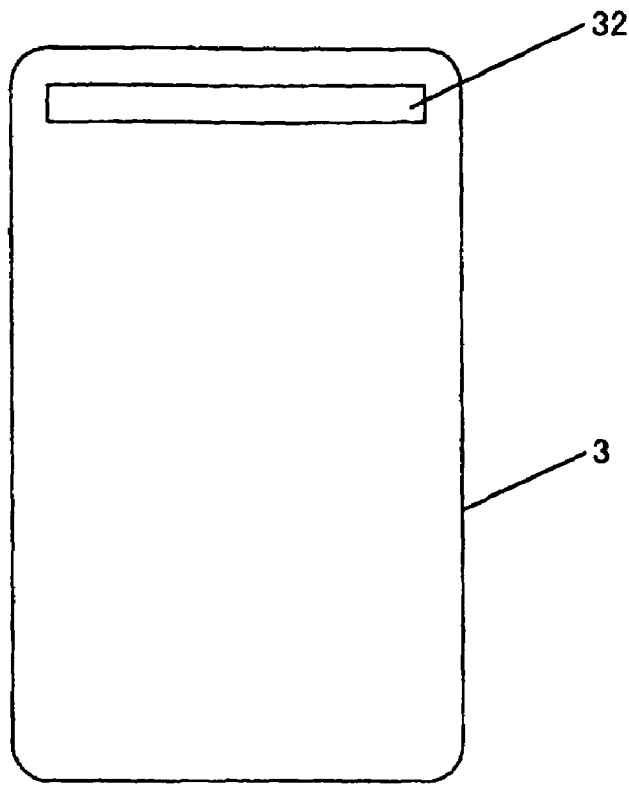
FIGS. 7A and 7B are a cross section and a perspective view showing another example of a cellular phone according to the embodiment, respectively.
Figure 7B:
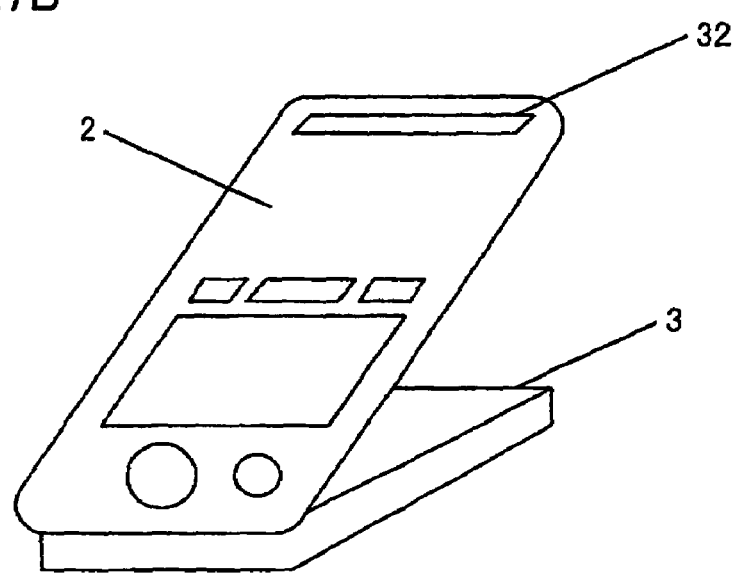

Description will now be given on antenna portion 25 of cellular phone 1 according to the embodiment of the invention. FIG. 6 is a cross section of second body 3 of cellular phone 1. A whip portion 30 of antenna portion 25 is retractably arranged in the left end portion of second body 3. Helical portion 26 is located outside the body. Whip portion 30 and helical portion 26 can be pulled out from second body 3 in accordance with an intensity of radio waves in the communication operation. Antenna portion 25 is not restricted to the above structure including whip portion 30 and helical portion 26. For example, as shown in FIGS. 7A and 7B, an internal antenna 32 having an inverted-F form may be arranged in an upper portion of second body 3 near hinge 4 (FIG. 7A) or an upper portion of first body 2 (FIG. 7B).

The internal structure of cellular phone 1 will now be described with reference to an internal block diagram of FIG. 8. Cellular phone 1 includes first display portion 5, second display portion 20, first shutter button 10, second shutter button 23, camera portion 21, light portion 22 having a red LED 22R, a green LED 22G and a blue LED 22B, antenna portion 25, speaker portion 28, a radio portion 50, a communication control portion 51, a first memory 42, a second memory 48, a third memory 52, first display driver portion 43, second display driver portion 44, a first backlight 45, a second backlight 46, a control portion 40, which includes an audio reproduction portion 40A, an illumination light amount control portion 40B and a light color changing portion 40C for controlling functions of various portions, an image processing portion 41, an inversion processing portion 41A, a first operation button group 47, second operation button group 24 and an open/close detecting portion 49.

Control portion 40 controls functions of various portions such as a function of the shutter operation, a backlight function, an auxiliary light source function and a display function. Image processing portion 41 has an amplifier portion (not shown), an AD (Analog-to-Digital) converting portion and a signal processing portion, and also includes inversion processing portion 41A. The amplifier portion amplifies electric signals corresponding to the RGB provided from camera portion 21, and provides the amplified signals to the A/D converting portion. The A/D converting portion converts the electric analog signals, which correspond to the RGB and are amplified by the amplifier portion, to digital signals, and thereby provides image data to the signal processing portion. The signal processing portion effects signal processing such as pixel interpolating processing on the image data provided from the A/D converting portion, and provides the data thus processed to inverting processing portion 41A. When inverting processing portion 41A receives the image data and control portion 40 issues an inversion control signal 55, inverting processing portion 41A effects 180-degree inversion on the provided image data to rotate the corresponding image by 180 degrees. When inverting processing portion 41A does not receive inversion control signal 55, inverting processing portion 41A outputs the input image data as it is. The image data provided from inverting processing portion 41A is provided to first memory 42 and second memory 48.

Camera portion 21 and image processing portion 41 form the picture taking portion, which receives light reflected by subject 30, converts it to electric signals and provides the signals as image data of each frame. First memory 42 and second memory 48 temporarily store the image data of a plurality of frames, which are successively provided, under the control of control portion 40. For example, for receiving and storing image data, which is newly provided, the control is performed to delete image data, which is included in a plurality of data stored in first memory 42 and second memory 48 and has been stored for a long time, or to overwrite such image data with the received new image data.

Control portion 40 sends the control signal to first display driver portion 43 and second display driver portion 44, and reads the image data stored in first memory 42 and second memory 48 to provide the read data to first display driver portion 43 and second display driver portion 44, respectively. The first display driver portion 43 and second display driver portion 44 apply drive voltages to pixel electrodes in first display portion 5 and second display portion 20 in accordance with the data to be displayed on first display portion 5 and second display portion 20, and thus in accordance with the data read from first memory 42 and second memory 48.

First backlight 45 and second backlight 46 include light-emitting elements such as light-emitting diodes, and emit the light to first display portion 5 and second display portion 20 for increasing brightness of the displayed images, respectively. Control portion 40 controls the turn-on/off of first backlight 45 and second backlight 46, and also controls the brightness thereof. Each of first backlight 45 and second backlight 46 can be controlled independently of each other. Control is performed to turn on first backlight 45 when first display portion 5 displays images. When second display portion 20 displays images, control to performed to turn on second backlight 46. First backlight 45 and second backlight 46 may be configured to keep the on state until the user performs a predetermined operation for turn-off. Also, first backlight 45 and second backlight 46 may be turned off when a predetermined time elapses after turn-on.

First operation button group 47 includes input button group 7 and function button group 8 arranged on second body 3 already described. Second operation button group 24 includes operation buttons 24a and 24b arranged on first body 2.

First shutter button 10 and second shutter button 23 can be pressed for performing the shutter operation. When first (or second) shutter button 10 (or 23) is pressed, a shutter instruction 56 (or 57) is sent to control portion 40. When control portion 40 receives shutter instruction 56 (or 57), control portion 40 reads out the image data, which is to be stored according to the user's request, from the plurality of image data, which were continuously written into first memory 42 and second memory 48 for temporary storage, and writes it into third memory 52. Thereby, third memory 52 stores the image data requested by the user. For the sake of simplicity, it is assumed that the latest image data stored in first memory 42 and second memory 48 are read and stored in third memory 52.

Open/close detecting portion 49 determines whether cellular phone 1 is folded or not. A detection switch (not shown) for detecting the open and closed states is arranged within hinge 4. A detection signal 53 corresponding to the detected state (open state or closed state) is sent to control portion 40. Control portion 40 determines, based on detection signal 53 sent from the detection switch, whether cellular phone 1 is folded (closed) or open.

When performing radio communication with a base station (not shown) via radio waves, antenna portion 25, radio portion 50 and communication control portion 51 send and receive voice data, text data, image data and others under the control of control portion 40. Control portion 40 stores the data thus received in third memory 52.

Figure 8:
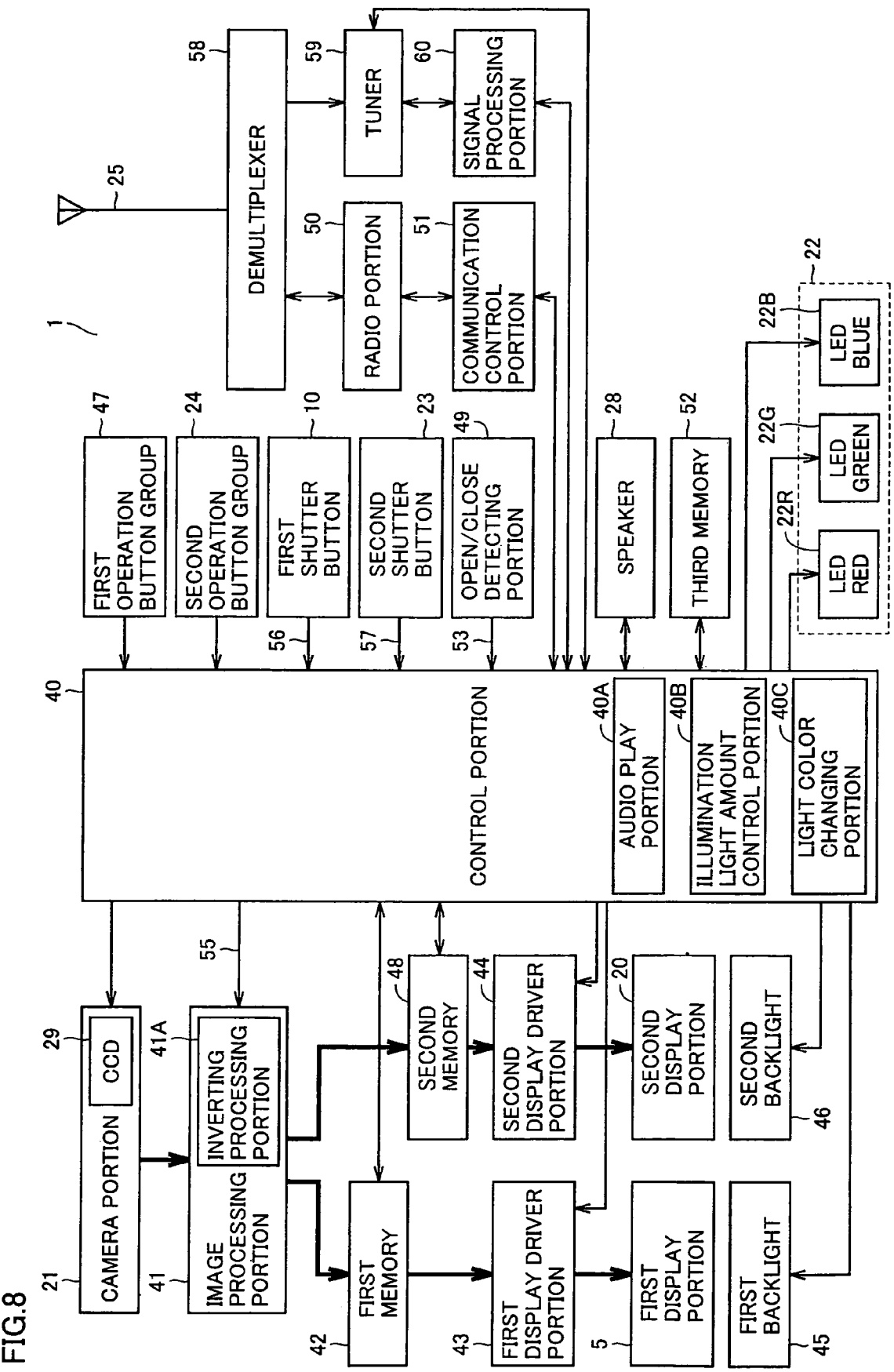
FIG. 8 is a block diagram illustrating a structure of the cellular phone according to the embodiment.

Referring to FIG. 8, cellular phone 1 according to the embodiment of the invention can receive television signals. Cellular phone 1 includes a demultiplexer 58 for separating radio communication waves and television broadcast signal waves from radio waves received on antenna portion 25. Demultiplexer 58 sends the radio communication waves to radio portion 50, and sends the television signal broadcast waves to a tuner 59. Tuner 59 receiving the television signal broadcast waves provides the signals of the received channel to a signal processing circuit 60. Signal processing circuit 60 separates video signals and audio signals from the signals received from tuner 59. Under the control of control portion 40, the video signals are provided to first display portion 5 or second display portion 20. Under the control of control portion 40, the audio signals are provided to first speaker 6 or second speaker 28.

The user can change the receive channel to an intended channel by pressing first operation button group 47 or second operation button group 24. Based on the press of first operation button group 47 or second operation button group 24, the control portion sends a control signal to tuner 59 for controlling change of the receive channel. Tuner 59 changes the channel based on the control signal.

Control portion 40 changes the display portion, which displays images based on the image data temporarily stored in the first memory, based on results of detection by open/close detecting portion 49. When open/close detecting portion 49 detects that cellular phone 1 is in the folded state, control portion 40 provides image data received from first memory 42 to second display driver portion 44, and displays an image on second display portion 20. When open/close detecting portion 49 detects that cellular phone 1 is not folded (i.e., is open), control portion 40 provides the image data received from first memory 42 to first display driver portion 43, and displays an image on first display portion 5.

As described above, when cellular phone 1 is folded, the shooting direction of camera portion 21 is directed outward. For taking a picture of a subject other than the user of cellular phone 1, the user opens cellular phone 1, and directs camera portion 21 to subject 30 opposite to the user, as shown in FIG. 5A. In this state, first display portion 5 displays an image based on the image data provided from camera portion 21. Thereby, the user can use first display portion 5 as a finder during the image taking operation.

For taking an image of the user himself, the user keeps cellular phone 1 in the folded state, and directs camera portion 21 to the user for taking a picture, as shown in FIG. 5B. In this state, second display portion 20 displays the image based on the image data provided from camera portion 21. Thereby, the user can use second display portion 20 as a finder.

According to cellular phone 1 of the embodiment of the invention, the user can merely open or close first body 2 of cellular phone 1 while keeping second body 3 in a fixed position, and thereby the portion, which is to be used as a finder during the image taking operation, can be appropriately switched between display portions 5 and 20 to allow the shooting operation. For changing the subject, therefore, the user is not required to change the position or direction of second body 3 on the user's hand, in contrast to a conventional cellular phone. Consequently, the user can change the subject with less labor, and the operability and convenience are improved.

Description will now be given on control of first backlight 45 and second backlight 46.

Control portion 40 selectively turns on and off first backlight 45 and second backlight 46 based on results of the detection by open/close detecting portion 49. When open/close detecting portion 49 detects that cellular phone 1 is in the folded state, control portion 40 turns on second backlight 46 to increase the brightness of second display portion 20. When open/close detecting portion 49 detects that cellular phone 1 is in the open state, control portion 40 turns on first backlight 45 to increase the brightness of first display portion 5.

As described above, when the user intends to take a picture of the subject other than the user, first display portion 5 is used as a finder, and displays image data obtained by camera portion 21. In this operation, first backlight 45 is turned on to increase the brightness of first display portion 5.

When the user intends to take a picture of the user himself, second display portion 20 is used as a finder, and second display portion 20 displays image data obtained by camera portion 21. In this operation, second backlight 46 is turned on to increase the brightness of second display portion 20.

As described above, when cellular phone 1 is folder or opened, control is performed to turn on the backlight supplying light to the display portion to be used as a finder so that the displayed image becomes more visible, and the visibility is improved.

Control portion 40 is provided with audio reproducing portion 40A for reproducing MP3 data. The MP3 data, which is taken into cellular phone 1 by downloading or via a cable connected to a personal computer or the like, is stored in third memory 52, and audio reproducing portion 40A can reproduce the MP3 data for outputting it from speaker 28. In connection with operations for volume control, play/stop and forward/backward feeding in the MP3 data reproduction, the user can perform intended operations by pressing first operation button group 47 or second operation button group 24. Control portion 40 and audio reproducing portion 40A changes the sound volume and the reproduction state based on the press of first operation button group 47 or second operation button group 24.

Control portion 40 includes an illumination light amount control portion 40B controlling a light amount of light portion 22, and a light color changing portion 40C changing a color of light emitted from light portion 22. Illumination light amount control portion 40B allows manual control of the light amount of light portion 22 when the user presses first operation button group 47 or second operation button group 24. Illumination light amount control portion 40B may be configured to increase or decrease automatically the light amount by determining ambient brightness in accordance with signals sent from camera portion 21. Light color changing portion 40C can change the light color from white, e.g., to red, green, blue, yellow, purple and light blue in accordance with combinations of LEDs 22R, 22G and 22B. The light color can be changed to an intended color by operating the light emission based on the press of first operation button group 47 or second operation button group 24 by the user.

FIG. 9 is a table illustrating allocation of functions to second shutter button 23 and second operation buttons 24a and 24b. Cellular phone 1 has two modes, i.e., a normal mode and a camera mode. After the power-on of cellular phone 1, cellular phone 1 operates in the normal mode. For photographing, cellular phone 1 must be switched to the camera mode for activating the camera function and allowing use of the display portion as a finder.

In this embodiment of the invention, it is not necessary that the allocation to second shutter button 23 and second operation buttons 24a and 24b is made to allow the selection of all the functions and the change of all the control magnitudes illustrated in FIG. 9. For example, a manufacturer of cellular phone 1 may allocate the selection/change of only necessary functions and magnitudes among them to the above buttons. In FIG. 9, buttons corresponding to shaded items are utilized as decision buttons for selecting the functions, and buttons corresponding to unshaded items are utilized as various directional buttons for changing the control magnitudes.

Figure 10:
FIG. 10 shows a pictograph display screen of the cellular phone according to the embodiment.

When there is no calling to or from cellular phone 1 after the power on, this state is generally referred to as a standby state. Second display portion 20 displays a standby image set by the user or a standby screen representing a clock or the like. Second display portion 20 can display pictographs shown in FIG. 10 on the standby screen. By pressing second operation button 24a, the user can turn on/off the pictograph display.

By pressing second operation button 24a for one second or more, the user can lock second shutter button 23 and second operation buttons 24a and 24b. The second shutter button 23 and second operation buttons 24a and 24b are arranged on the surface, which is exposed externally even when cellular phone 1 is folded. Therefore, these buttons may be pressed unintentionally or accidentally due to contact or touch. By locking these buttons, it is possible to invalidate such unintentional pressing of second shutter button 23 and second operation buttons 24a and 24b. The user can release the locked state by pressing second operation button 24a for one or more seconds.

When the user presses second operation button 24b, light portion 22 is turned on while it is in the pressed state. When second operation button 24b is kept in the pressed state for one or more seconds, light portion 22 changes to a continuous-on state. When the user presses the button for one or more second in the continuous on state, light portion 22 is turned off. By these setting, the user can select the light-emitting states of light portion 22 so that light portion 22 can be manually turned on/off, and can be always kept on similarly to a flashlamp. This improves the operability and convenience. By selecting the control manner between the short press and long press, multiple kinds of control can be achieved without increasing the number of operation buttons so that it is possible to suppress increase in cost due to increase in size and number of parts of the cellular phone.

When the user presses second shutter button 23 during the standby state, second display portion 20 displays, on its lower region, a left arrow, a selection item and a right arrow in this order. In this case, second operation button 24b can be used for successive selection. Each time second operation button 24b is pressed, second display portion 20 successively displays, in a region between the arrows, wallpaper setting, image checking, light amount, light color, incoming call, mail arrival, end of display and wallpaper setting in this order. The second operation button 24a is a backward selection button, and can be operated to change the selection items in the order of mail arrival, incoming call, light color, light amount, image checking, wallpaper setting, end of display and mail arrival in this order. When user presses second shutter button 23 functioning as the decision key in this situation after selecting the item with second operation button 24a or 24b, cellular phone 1 starts the operation for the item selected by the user.

The wallpaper setting mode is a mode for setting a standby screen displayed on second display portion 20. In this mode, setting can be performed to display selectively image files such as wallpaper images or taken images stored in third memory 52 of cellular phone 1, clock function, animation and JAVA (registered trademark) application. Each time the user presses second operation button 24a or 24b, the contents displayed on second display portion 20 change. By pressing second shutter button 23, the setting is completed, and the state of cellular phone 1 returns to the standby state.

The image checking mode is a mode for displaying and thereby checking the images, which are taken by camera portion 21 and are stored in third memory 52. Each time the user presses second operation button 24a (forward) or 24b (backward), second display portion 20 successively changes the taken images displayed thereon. For displaying only the taken images by discriminating them from other images, cellular phone 1 may be preset to store the taken images into a predetermined folder in the third memory, and the images stored in this folder may be successively displayed. Alternatively, flags may be assigned to files of images taken by camera portion 21 when storing such images, and only the image files thus flagged may be displayed.

Figure 11A:
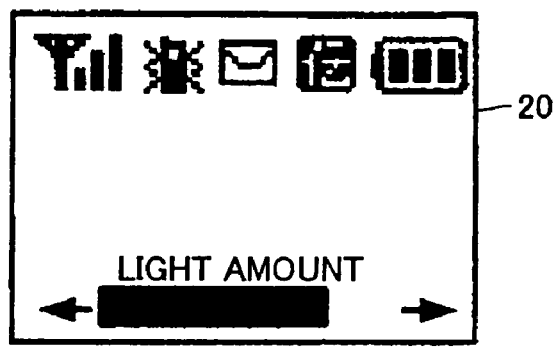
FIGS. 11A and 11B show a light amount control screen of the cellular phone according to the embodiment.

The light amount mode is a mode for controlling the light amount of light portion 22. In the light amount mode, as shown in FIG. 11A, second display portion 20 displays, on its lowermost region, right and left arrows as well as an indicator, which extends horizontally on the screen for indicating a current amount of the light. Each time the user presses second operation button 24a (bright) or 24b (dark), the indicator increases or reduces its length, and at the same time, the light amount of light portion 22 changes. When the user presses the left button (second operation button 24b) for a long time of one or more seconds, light portion 22 stops the light emitting. As described above, the user can operate second operation buttons 24a and 24b to control the light amount of light portion 22 without opening the folded cellular phone. Therefore, the operability and convenience can be improved.

Figure 12:
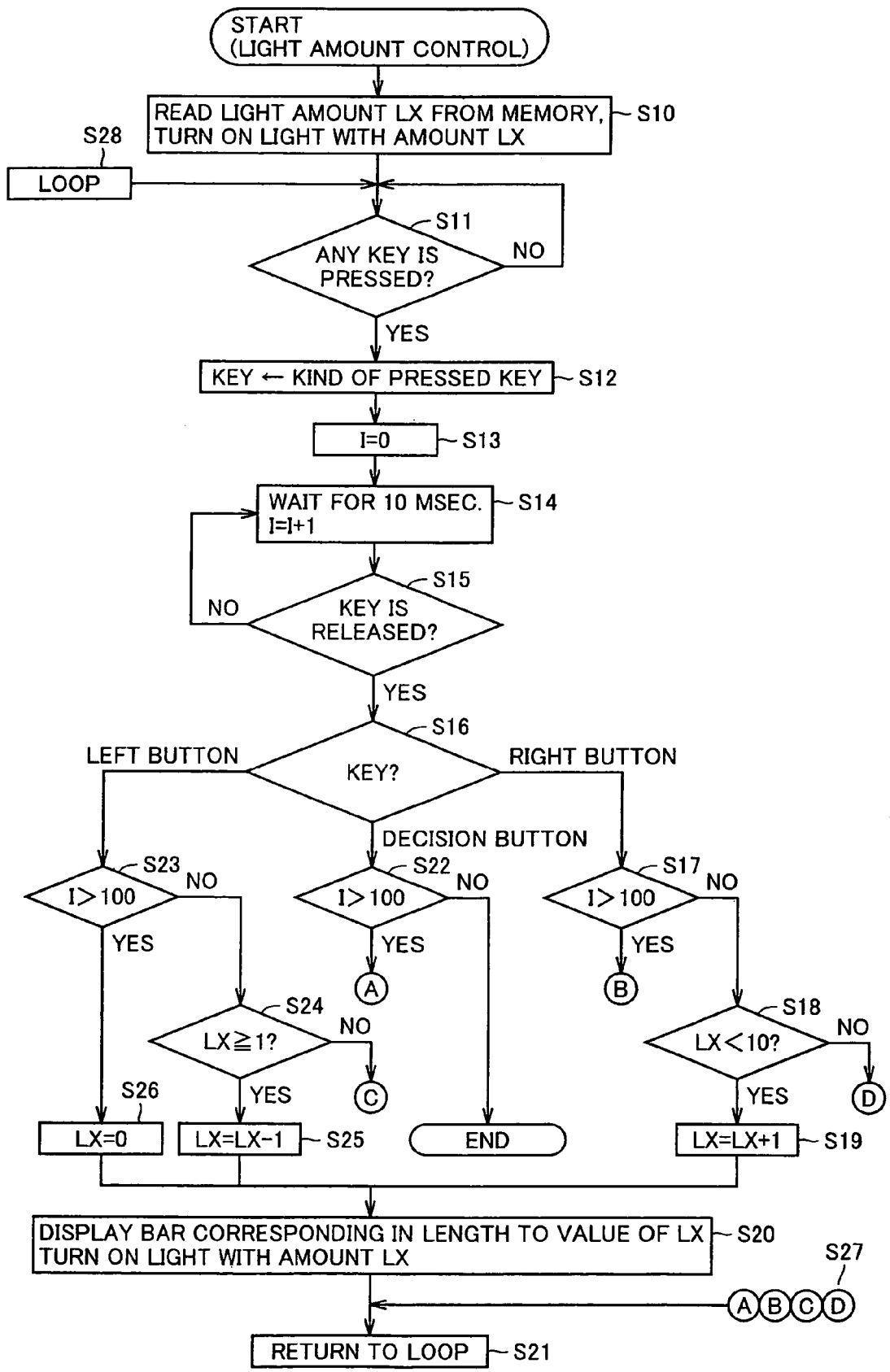
FIG. 12 is a flowchart illustrating light amount control steps in the cellular phone according to the embodiment.

By using buttons 23, 24a and 24b arranged on the rear surface of first body 2, the light amount of light portion 22 can be controlled, as will now be described in accordance with a flowchart of FIG. 12. The following description will be given on the process performed after the light amount control mode is achieved by performing predetermined operations to select the light amount control mode on the menu screen.

When cellular phone 1 enters the light amount control mode, control portion 40 reads light amount data LX from third memory 52, and turns on the light with the light amount based on light amount data LC in step S10. When light portion 22 is already on, no change substantially occurs. Control portion 40 determines whether the user is pressing button 23, 24a or 24b arranged on the rear surface (step S11). When the button is being pressed, control portion 40 determines the button, which is being pressed by the user, and stores an identification number of the determined button in the memory (step S12). Then, a counter value I is set to zero for determining whether the user pressed the button for an ordinary time (short press) or a long time (long press) (step S13). After 10 milliseconds, counter value I is incremented by one (step S14). While the user is pressing the button, counter value I is incremented by one in response to every elapsing of 10 milliseconds (step S15). When the user releases the button (YES in step S15), processing corresponding to the pressed button starts (step S16).

When the user pressed the right button, control portion 40 determines the time (counter value I), for which the button was kept in the pressed position (step S17). When counter value I is larger than 100, control portion 40 determines that the long press was performed. In this case, no definition has been prepared for the long press of the right button so that the process moves through step S27 to step S21. When counter value I is equal to or lower than 100, control portion 40 determines whether light amount LX is smaller than a maximum value of 10 (step S18). When light amount LX is equal to or larger than 10 (NO in step S18), the light amount cannot be increased further so that the process moves through step S27 to step S21. If light amount LX is smaller than 10 (YES in step S18), control portion 40 increments the value of light amount LX by one (step S19), and turns on the light with light amount LX while displaying a bar of a length corresponding to the value of light amount LX on the second display portion (step S20).

When the user pressed the decision button, control portion 40 determines the time (counter value I), for which the button was kept in the pressed position (step S22). If counter value I is larger than 100, control portion 40 determines that the long press was performed. In this case, no definition has been prepared for the long press of the decision button so that the process moves through step S27 to step S21. When counter value I is equal to or lower than 100 (NO in step S22), this means that the user ends the light amount control so that control portion 40 ends the light amount control mode to keep current light amount LX.

When the user pressed the left button, control portion 40 determines the time (counter value I), for which the button was in the pressed position (step S23). When counter value I is larger than 100 (YES in step S23), control portion 40 determines that the long press was performed. In this case, the long press of the left button means turn-off of the light so that light amount LX is set to zero (step S26). When counter value I is equal to or smaller than 100 (NO in step S23), control portion 40 determines whether light amount LX is lower than 1 or not (step S24). When light amount LX is zero, the light amount cannot be lowered further so that the process moves through step S27 to step S21. When light amount LX is equal to one or more (YES in step S24), control portion 40 decreases the value of light amount LX by one (step S25), and turns on the light with decreased light amount LX while displaying a bar of a length corresponding to the value of light amount LX on the second display portion (step S20).

When the process moves to step S21, the process further moves to step S28, and the process of controlling the light amount is performed again.

Figure 11B:
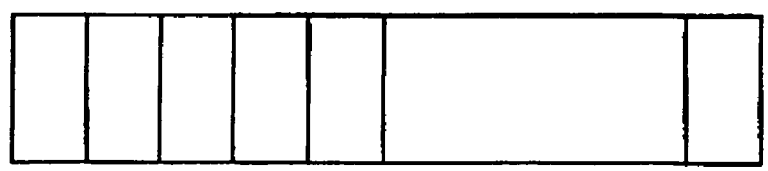

FIG. 11B shows, by way of example, the display of the bar of the length corresponding to the value of light amount LX (step S20). In response to increase of light amount LX by one, block images starting from the left side increases by one, and all the block images are displayed when light amount LX attains a maximum amount of 10. FIG. 11A represents an example of actual display on the second display portion. As described above, second display portion 20 visually displaying the control magnitude and the control buttons are arranged on the same surface of cellular phone 1. Thereby, the user can operate the buttons on cellular phone 1 in the folded state while viewing the control magnitudes so that the operability and convenience are improved. In the various control modes, which will be described below, the bar is displayed in a similar manner so that the user can perform the operation while viewing the control magnitude on cellular phone 1 in the folded state.

A light color mode is a mode for changing the light color of light portion 22. Light portion 22 includes red LED 22R, green LED 22G and blue LED 22B. Therefore, these LEDs can be selectively combined to emit the light in red, green, blue, yellow, purple or light blue in addition to the white light. Each time the user presses second operation button 24a (forward) or 24b (backward), light portion 22 changes the color of light emitted therefrom. When the user pressed the left button (second operation button 24b) for one or more seconds, and thus performed the long press, light portion 22 stops the light emission. As described above, by manipulating second operation button 24a or 24b, the user can change the light color of light portion 22 without opening cellular phone 1 in the folded state so that the operability and convenience are improved.

An incoming call record mode is a mode of displaying a record of incoming calls. Since third memory 52 has stored the record of incoming calls, it is possible to display the time and caller after cellular phone 1 received an incoming call. Second display portion 20 displays the incoming call times and the telephone numbers or names of callers, and second display portion 20 changes contents of the incoming call record each time the user presses second operation button 24a (newer call) or 24b (older call). In this manner, the user can manipulate second operation button 24a or 24b to select the incoming call record displayed on second display portion 20 without opening cellular phone 1 in the folded state. Therefore, the operability and convenience are improved.

A mail display mode is a mode for browsing a mail received by cellular phone 1. Second display portion 20 displays its title and sender. When the user presses second shutter button 23, second display portion 20 displays a body of the mail. Each time the user presses second operation button 24a (next mail) or 24b (previous mail), second display portion 20 changes the reception record. The mail display mode ends when the user presses second shutter button 23 for a long time. As described above, the user can select the received mail, of which contents are displayed on second display portion 20, by pressing second operation button 24a or 24b without opening cellular phone 1 in the folded state so that the operability and convenience are improved.

Figure 13:
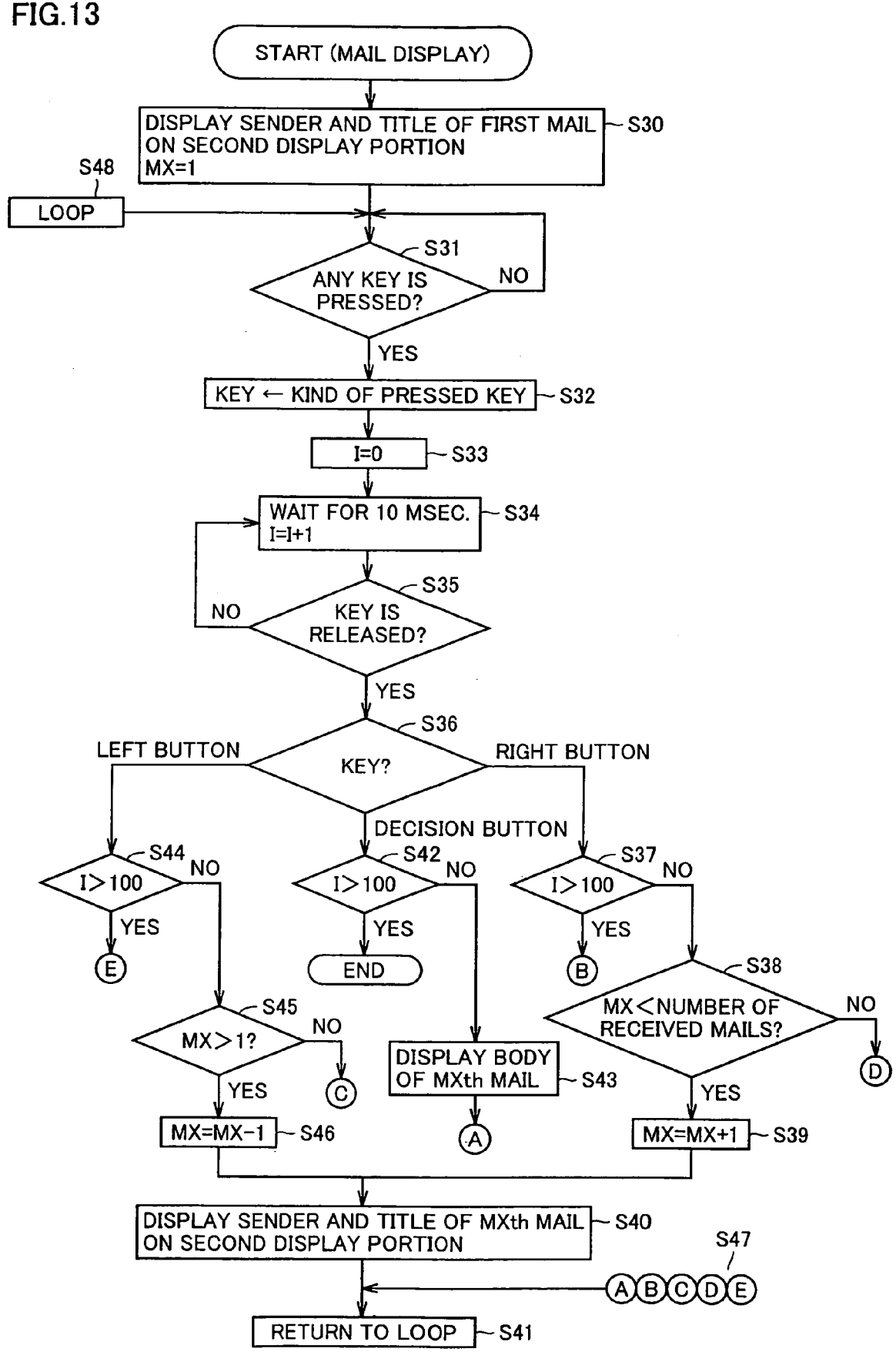
FIG. 13 is a flowchart illustrating mail checking steps in the cellular phone according to the embodiment.

With buttons 23, 24a and 24b arranged on the rear surface of first body 2, the user can display contents of the mail on second display portion 20 in the following manner, which will now be described with reference to a flowchart of FIG. 13. The following description will be given on process which are performed after the user selected the mail content display mode on the menu screen of second display portion 20 through predetermined operations, and cellular phone 1 entered the mail content display mode. Except for selection on the menu screen, cellular phone 1 may be configured to enter the mail content display mode when the user pressed a button within five seconds after cellular phone 1 received a mail.

When cellular phone 1 entered the mail content display mode, control portion 40 reads the mail at the first position in third memory 52, and displays the sender and title of the first mail on second display portion 20. In a mail box of the memory, values MX representing mail numbers starting from the mail at the first position are allocated to the mails, respectively. In this case, mail number MX is set to "1" (step S30). Then, control portion 40 determines whether the user pressed button 23, 24a or 24b arranged on the rear surface or not (step S31). When the button was pressed, control portion 40 determines or specifies the button pressed by the user, and stores identification information of the button thus determined in the memory (step S32). Then, counter value I is set to zero for determining whether the user pressed the button for a normal time (i.e., short press) or for a long time longer than the normal time (step S33). After 10 seconds, counter value I is incremented by one (step S34). While the user is pressing the button, counter value I increases by one in response to every elapsing of 10 milliseconds. When the user stops pressing of the button, a process corresponding to the pressed button starts (step S36).

When the user pressed the right button, control portion 40 determines the time (counter value I), for which the button was pressed (step S37). If the value I is larger than 100, control portion 40 determines that the long press was performed. In this case, no definition has been prepared for the long press of the right button so that the process moves through step S47 to step S41. When counter value I is equal to or lower than 100, control portion 40 determines whether mail number MX is smaller than the maximum number of stored mails (step S38). When mail number MX is equal to or larger than the maximum number of stored mails, there is no next mail so that the process moves through step S47 to step S41. When mail number MX is smaller than the maximum number of stored mails, control portion 40 increments mail number MX by one (step S39), and control portion 40 writes data for display in the display memory so that second display portion 20 may display the sender and tile of the mail bearing mail number MX (step S40).

When the user pressed the decision button, control portion 40 determines the time (counter value I), for which the button was pressed (step S42). When value I is larger than 100, control portion 40 determines that the long press was performed. In this case, the long press of the decision button means that the user intends to end the mail display. Therefore, control portion 40 ends the mail display mode. When the value I is equal to or lower than 100, control portion 40 displays the body of the mail bearing mail number MX on second display portion 20 (step S43), and the process moves through step S47 to step S41.

When the user pressed the left button, control portion 40 determines the time (counter value I), for which the button was pressed (step S44). When counter value I is larger than 100, control portion 40 determines that the long press was performed. In this case, no definition has been prepared for the long press of the left button so that the process moves through step S47 to step S41. When the value I is equal to or lower than 100, control portion 40 determines whether mail number MX is larger than one or not (step S45). When mail number MX is equal to or lower than one, the mail bearing this number is the first mail so that the process moves through step S47 to step S41. When mail number MX is larger than one, control portion 40 decrements the value of mail number MX by one (step S46). For displaying the sender and title of the mail of mail number MX on second display portion 20, control portion 40 writes data for such display in the display memory (step S40). The process moves to step S41, and further moves to step S48 so that control portion 40 repeats the processes for displaying the mail.

As described above, the user can use three buttons for cellular phone 1 to perform the operations for forward/backward display of the senders and titles of the mails, display of mail body and ending of the mail display mode.

Cellular phone 1 enters the incoming call record mode or the mail display mode when the corresponding selection item is selected during the standby state. In addition to this selecting operation, the user can selectively achieve such modes by pressing second shutter button 23 when receiving a call or a mail. Second display portion 20 performs specific display for a predetermined time after receiving a call or a mail. If the user presses second shutter button 23 when this specific display is performed, cellular phone 1 can enter the incoming call record mode or the mail display mode without displaying the foregoing selection items.

Since cellular phone 1 provided with television tuner 59, second display portion 20 can display television images. When the television images are displayed, the user can operate second operation buttons 24a and 24b to select the channel or to control the sound volume. The user can select the intended operation from the channel selection and the volume control by pressing shutter button 23. As described above, when the user watches the television on second display portion 20, the user can change the channel without opening cellular phone 1 for operating numeric buttons or the like, but can change the channel by manipulating second operation buttons 24a and 24b while keeping cellular phone 1 in the folded state so that the operability and convenience are improved. Further, when listening to a sound of the television program with cellular phone 1, the user can change the volume without opening cellular phone 1 for operating numeric buttons or the like, and can change the sound volume by manipulating second operation buttons 24a and 24b while keeping cellular phone 1 in the folded state so that the operability and convenience are improved.

The user can manipulate shutter button 23 and second operation buttons 24a and 24b to reproduce the MP3 data stored in the third memory of cellular phone 1. As described above, when the user listens to the audio data with cellular phone 1, the user can change the tune or song to be reproduced without opening cellular phone 1 for operating numeric buttons or the like, and can change it by operating second operation buttons 24a and 24b so that the operability and convenience are improved.

Description will now be given on the operation of second shutter button 23 and second operation buttons 24a and 24b in the camera mode. When the user performs the long press of second shutter button 23 during standby, camera portion 21 is activated, and cellular phone 1 enters the camera mode. When the user presses second shutter button 23 in the camera mode, the shutter operates.

When the user presses second operation button 24b, light portion 22 changes the light color in the order of white, red, green, blue, yellow, purple, light blue and white in response to every button pressing, and keeps the on state only while second operation button 24b is being pressed. When second operation button 24b is continuously pressed for one or more seconds, light portion 22 changes to the continuous on state. When second operation button 24b is pressed for one or more seconds in the continuous-on state, light portion 22 is turned off. As described above, depending on the short press or the long press of second operation button 24b, it is possible to select the light color of light portion 22 as well as the on/off states of light portion 22 so that the operability and convenience are improved. By changing the control in accordance with the short press and the long press, it becomes possible to perform multiple kinds of control without increasing the number of operation buttons, and it is possible to suppress increase in cost, which may be caused due to increase in size and number of parts of cellular phone 1.

When the user presses second operation button 24a, setting can be performed in the camera mode. In the example illustrated in FIG. 8, when the user presses second operation button 24a one time, letters of "ZOOM" are displayed at the lowermost region in second display portion 20. By subsequently pressing second shutter button 23, which functions as the decision key in this embodiment, cellular phone 1 enters the zoom control mode. Alternatively, if the user does not press second shutter button 23, but continuously presses second operation button 24a, the mode changes in the order of the zoom control mode, brightness control mode, light amount control mode, light color mode and ending of control. When the intended control item is displayed, the user presses second shutter button 23 functioning as the decision button to place cellular phone 1 in the intended control mode.

The zoom control mode is a mode for controlling the zooming in the shooting operation. Similarly to the light amount mode already described, second display portion 20 displays, at its lowermost region, left and right arrows as well as an indicator, which extends horizontally on the screen for indicating the current zooming state. Each time the user presses second operation button 24a (zoom-in) or 24b (zoom-out), the indicator increases or decreases in length, and at the same time, the zooming state is controlling. When second shutter button 23 is pressed after the zooming control, the control mode ends, it becomes possible to operate the shutter by pressing second shutter button 23.

The brightness control mode is a mode for controlling the brightness of the taken image. Similarly to the light amount mode already described, second display portion 20 displays, at its lowermost region, left and right arrows as well as an indicator, which extends horizontally on the screen for indicating the current brightness. Each time the user presses second operation button 24a (bright) or 24b (dark), the indicator decreases or increases in length, and at the same time, control portion 40 controls the brightness of the displayed image.

In the above example, the brightness is controlled before the shutter operation. However, the timing of the brightness control is not restricted to this. For example, the second display portion may display a user checking screen, on which the user can determine whether the brightness control is to be effected on the image already taken or not before storing the image. When the user requests the brightness control, the cellular phone enters the brightness control mode. In this case, the image of which brightness is controlled by the user can be stored in third memory 52. If the image control is allowed before storing the taken image, control of tones and touches of images as well as application of image ornaments such as a frame can be effected by using second shutter button 23 and second operation buttons 24a and 24b, in addition to the brightness control of the taken images. As described above, the uses takes image, and processes the taken image while viewing it on second display portion 20 before saving the image, whereby the user can store the image, which is already subjected to the image control or processing. Accordingly, when the user intends to control and/or process the taken image immediately after the shooting, it is not necessary to read the image, which is already stored, and to effect the image control/processing on the image thus read so that the operability and convenience are improved.

The light amount mode is a mode for controlling the amount of light emitted from light portion 22. Second display portion 20 displays, at its lowermost region, left and right arrows as well as an indicator, which extends horizontally on the screen for indicating the current light amount. Each time the user presses second operation button 24a (bright) or 24b (dark), the indicator decreases or increases in length, and at the same time, the light amount of light portion 22 changes.

The light color mode is a mode for changing the light color of light portion 22. Since light portion 22 has red LED 22R, green LED 22G and blue LED 22B, these LEDs can be combined to emit the light, e.g., in red, green, blue, yellow, purple and light blue in addition to white. Each time the user presses second operation button 24a (forward) or 24b (backward), light portion 22 changes the color of light.

Figure 14:
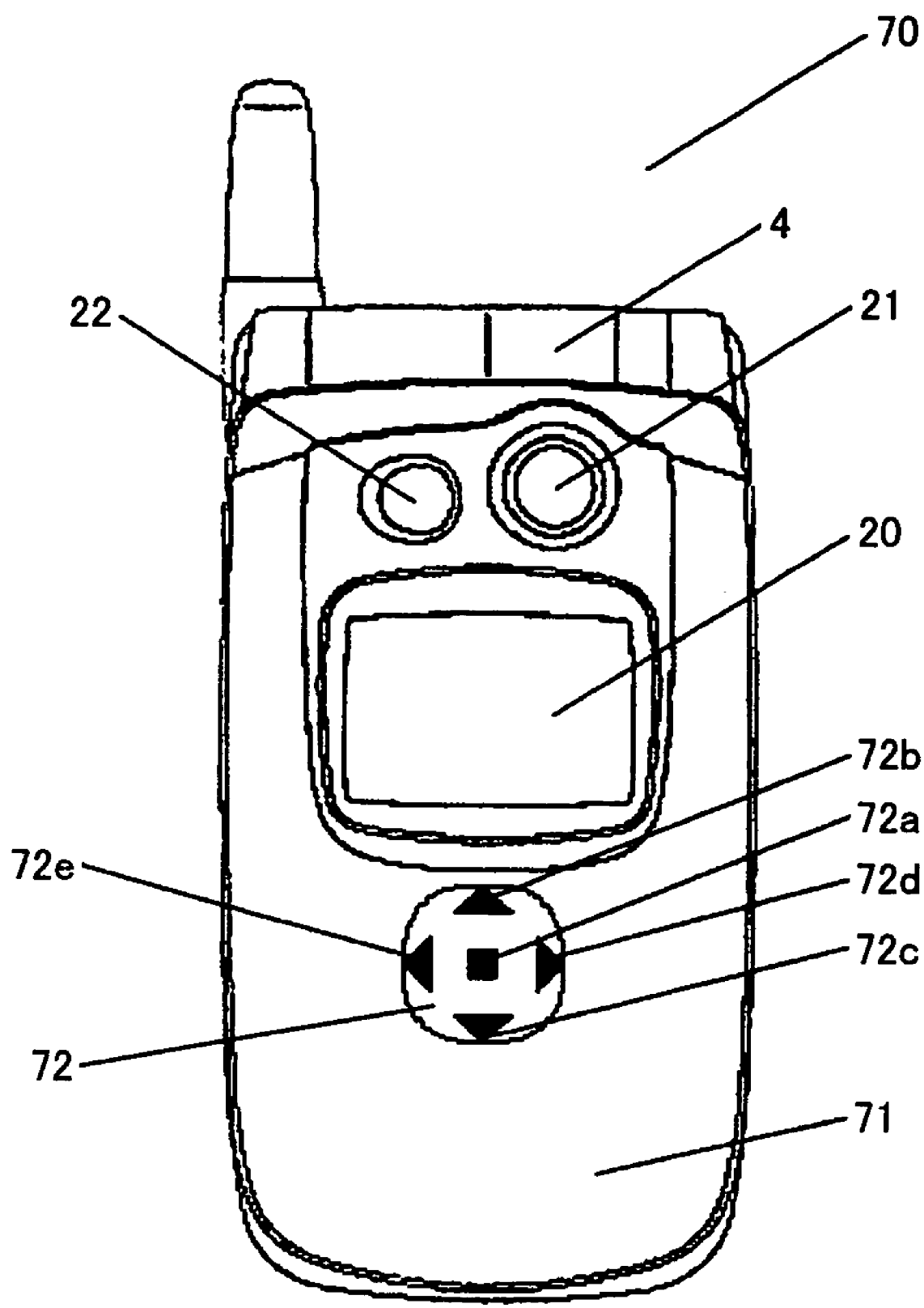
FIG. 14 is an elevation showing an outer appearance of another cellular phone in the folded state according to the embodiment.
Figure 17:
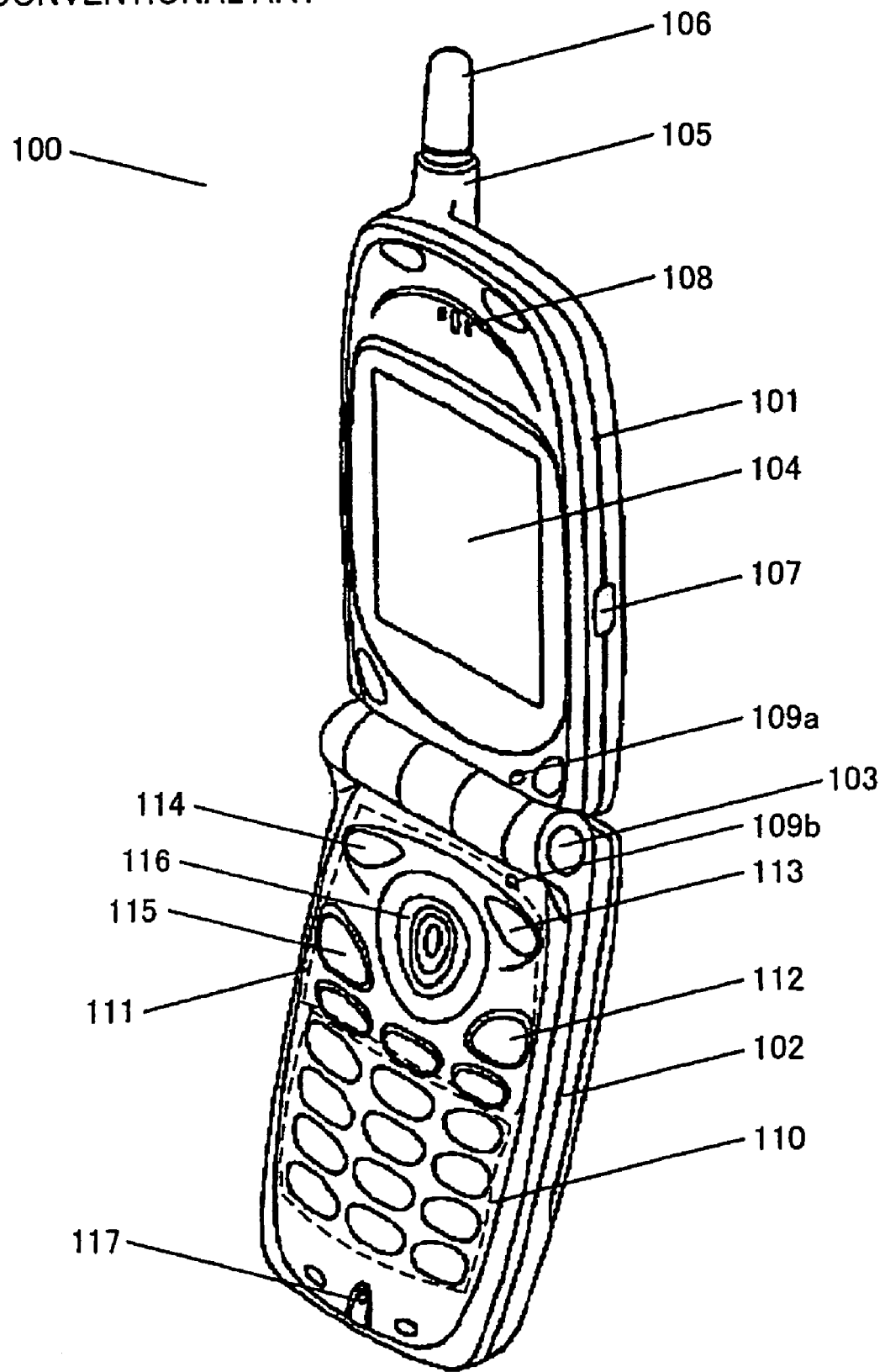
FIG. 17 is a perspective view showing an outer appearance of a conventional cellular phone.
Figure 18:
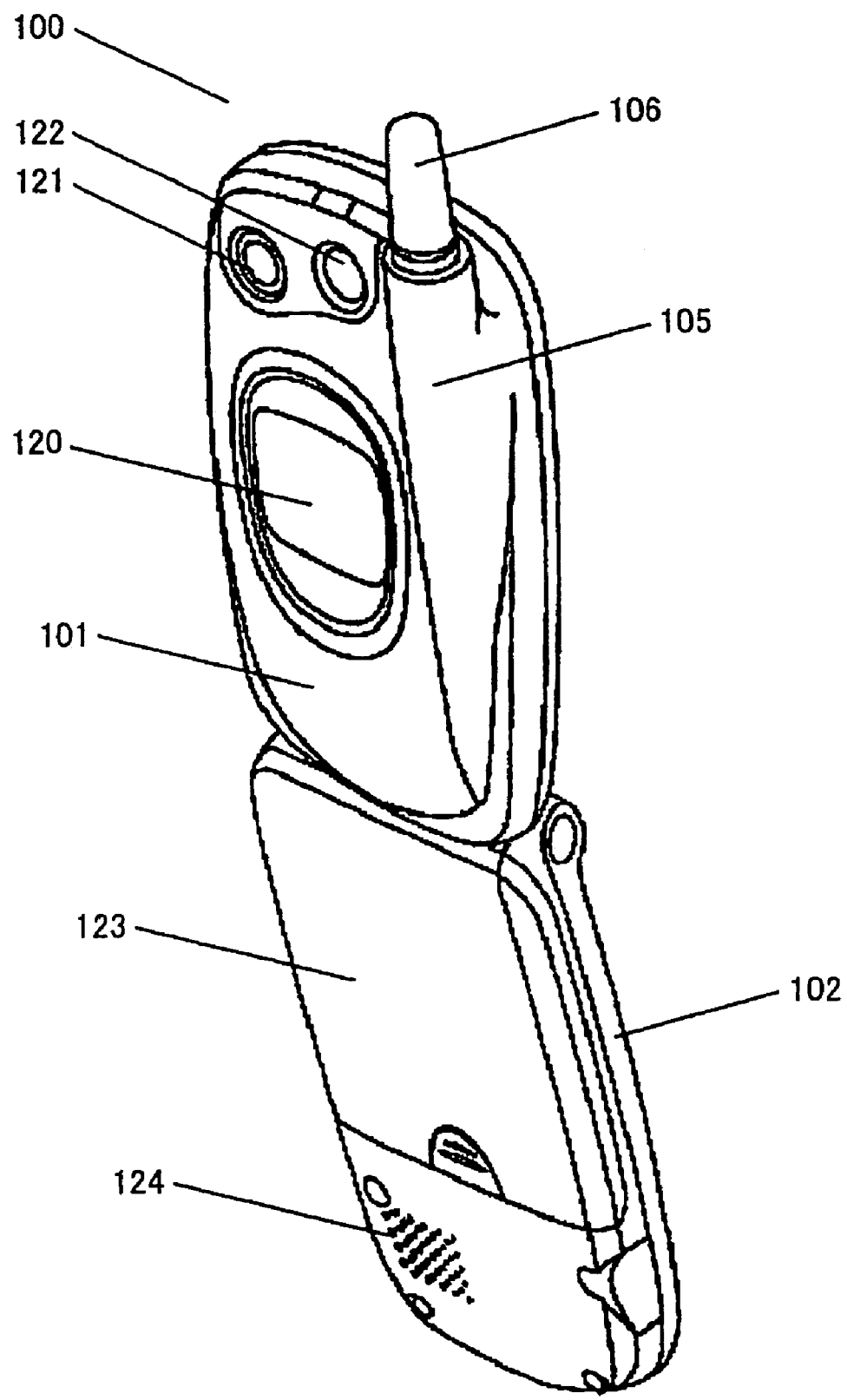
FIG. 18 is a perspective rear view showing an outer appearance of the conventional cellular phone.
Figure 19:
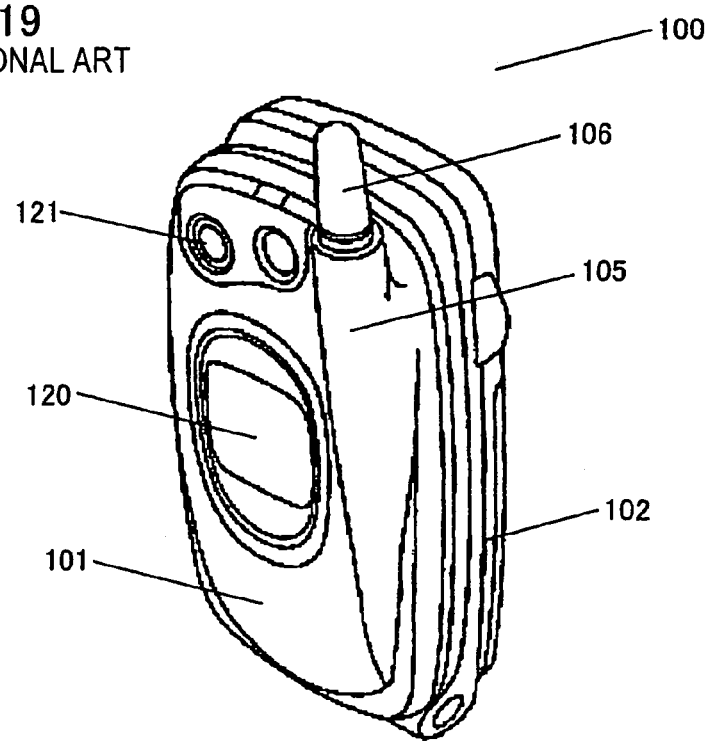
FIG. 19 is a perspective view showing an outer appearance of the conventional cellular phone in the folded state.
Figure 20:
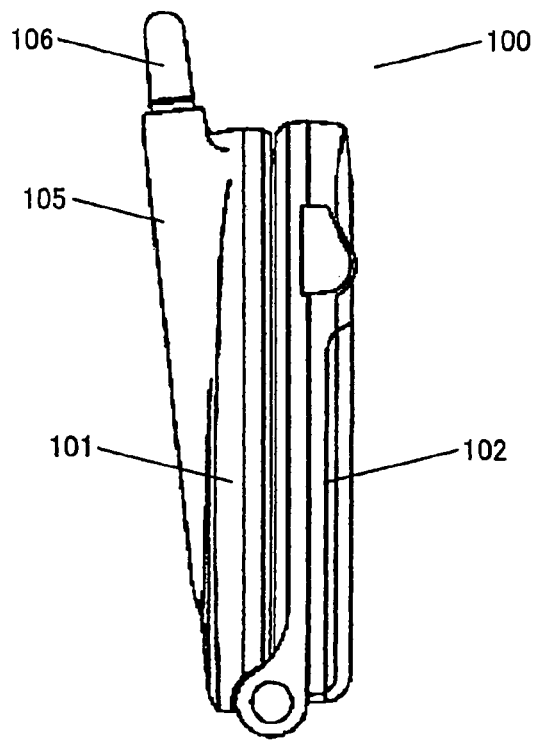
FIG. 20 is a side view showing an outer appearance of the conventional cellular phone in the folded state.
Figure 21A:
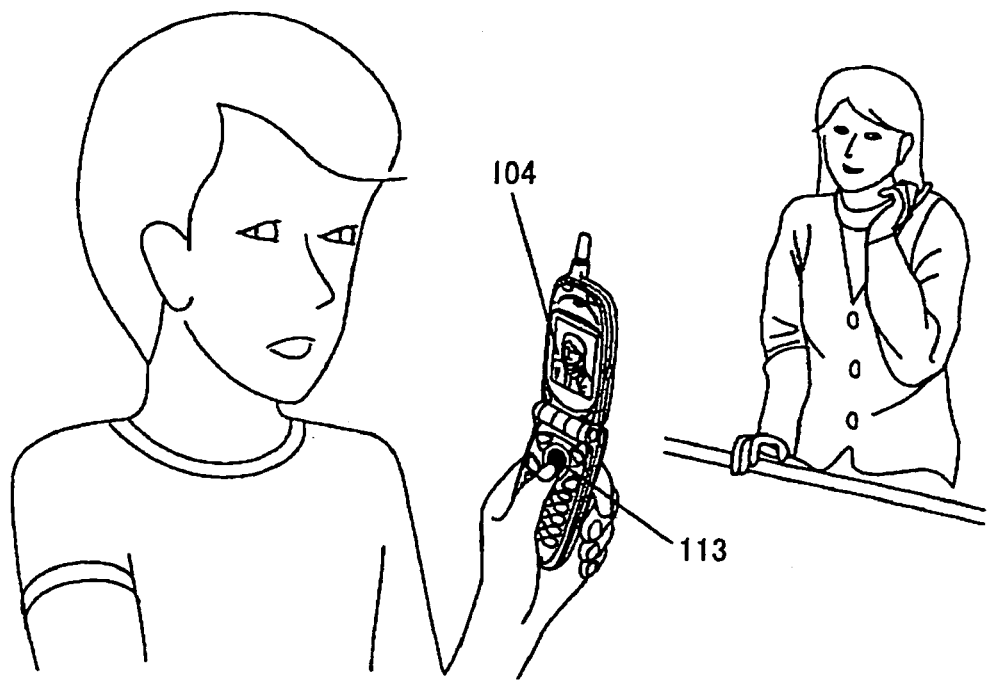
FIGS. 21A and 21B illustrate a manner of using the conventional cellular phone.
Figure 21B:
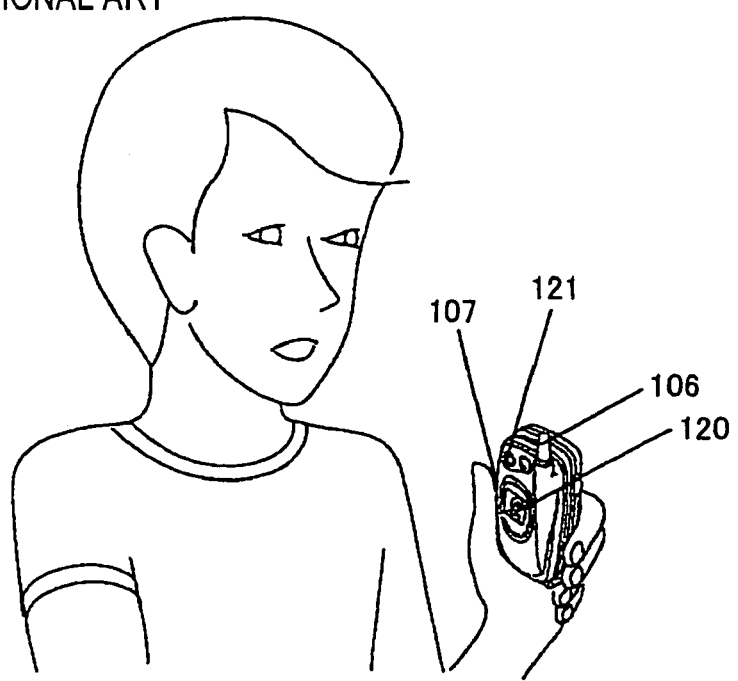

Another embodiment of the invention is shown in FIG. 14. A cellular phone 70 shown in FIG. 14 is provided at a rear surface of a first body 71 with camera portion 21 and light portion 22 located near hinge 4 as well as second display portion 20 spaced from hinge 4. A multi-button 72, which is a distinctive feature of cellular phone 70, is arranged near a side of second display portion 20 remote from hinge 4. Multi-button 72 corresponds to an integrated button of five buttons, i.e., a shutter/decision button 72a, an up button 72b, a down button 72c, a right button 72d and a left button 72e. Components, which are the same as those of cellular phone 1 already described, bear the same reference numbers.

FIG. 15 is a table representing allocation of functions of multi-button 72.

Cellular phone 70 has two modes, i.e., an ordinary mode and a camera mode. After the power-on, cellular phone 70 is in the ordinary mode. For taking pictures by the camera, the user must change cellular phone 70 to the camera mode for activating the camera function and using the display portion as a finder.

According to multi-button 72, the user can press up button 72b and down button 72c for selecting various control items, and can press left button 72e and right button 72d for changing control magnitudes in the setting modes selected with up button 72b and down button 72c. For example, when the user presses down button 72c one time during standby in the ordinary mode, light on/off setting is selected. When down button 72c is subsequently pressed two times, the image checking mode is selected. When right button 72d is pressed in the image checking mode, second display portion 20 successively displays images, which were taken by camera portion 21 and are already stored in third memory 52. Conversely, by pressing left button 72e, second display portion 20 successively and reversely displays the images.

Without opening cellular phone 70, as described above, the user can select the control items such as light on/off and image checking mode by operating up button 72b and down button 72c, and can change the control magnitude by operating right button 72d and left button 72e. Selection of the control items is independent of selection of the control magnitudes. This facilities the operation by the user. Also, selection of the control items and selection of the control magnitudes can be performed while keeping the close state, and it is not necessary to open the cellular phone for such selection and change so that the operability and convenience are improved. Further, second display portion 20 displays images taken by camera portion 21. Therefore, the user can perform selection of various control items, change of control magnitudes and processing for the images taken by camera portion 21 while keeping cellular phone 70 in the folded state. Consequently, the operability and convenience are improved.

In this embodiment described above, up button 72b and down button 72c are buttons for changing the control items. This is not restrictive. For example, all buttons 72a-72e of multi-button 72 may have functions as decision buttons for on/off selection of pictograph display, key-lock, light on/off and others.

FIG. 16 is a table illustrating allocation of operations to multi-button 72, which is modified based on the allocation in FIG. 15. In addition to the normal mode and the camera mode, cellular phone 70 can be set to several operation modes, i.e., the mail display mode, TV mode and MP3 play mode, which are independent from each other.

Cellular phone 70 can enter the mail display mode immediately after cellular phone 70 receives a mail, or when the user performs a specific operation (i.e., double-click of decision button 72a). When the user presses decision button 72a in the mail display mode, second display portion 20 displays a body of the latest mail. If the body of mail is too long to display it fully on second display portion 20, display portion 20 displays only a part of the body. The user can presses down button 72c to scroll the body up on the screen of second display portion 20 so that a subsequent portion of the mail can be displayed. Also, the user can presses up button 72b to scroll the mail down on the screen of second display portion 20 for displaying a beginning portion of the mail. The user can press left button 72e to display an older mail immediately preceding the mail, which is currently displayed. The user can press right button 72d to display on second display portion 20 a newer mail immediately following the mail, which is currently displayed. When the user intends to end the mail display mode, the user can double-click decision button 72a so that cellular phone 70 returns to the standby mode, and second display portion 20 displays the standby screen. As described above, even when cellular phone 70 is in the folded state, the user can operate cellular phone 70 to display the mail on second display portion 20, to scroll the mail and to display another mail. Thereby, when the user intends to read the mail body, the user is not required to open cellular phone 70 in the closed state for reading the mail on first display portion 5 and for selecting the intended mail with numeric buttons or the like. While keeping cellular phone 70 in the folded state, the user can change the mail to be displayed by operating right button 72d and left button 72e, and can scroll the displayed mail by operating up button 72b and down button 72c. Thereby, the operability and convenience are improved.

When the user performs a specific operation, cellular phone 70 enters the TV mode. According to the allocation of functions to multi-button 72 illustrated in FIG. 15, right button 72d and left button 72e function as buttons for selection of the receive channel as well as buttons for volume control. By pressing decision button 72a, the function is changed between the receive channel selection and the volume control. In this example, right button 72d and left button 72e are allocated to the receive channel selection, and up button 72b and down button 72c are allocated to the volume control so that the operations can be simplified. As described above, even when cellular phone 70 is kept in the folded state, the user can operate cellular phone 70 to display television images by second display portion 20. The user can use the channel buttons and volume buttons to change the channel and the volume. Thereby, the operability and convenience are improved.

When the user performs a specific operation, cellular phone 70 enters the MP3 play mode. According to the allocation of functions to multi-button 72 illustrated in FIG. 15, right button 72d and left button 72e function as buttons for a play or reproduction operation as well as buttons for volume control. By pressing decision button 72a, functions are changed between the reproduction operation and the volume control. In this example, right button 72d and left button 72e are allocated to the reproduction operation, and up button 72b and down button 72c are allocated to the volume control so that the operations can be simplified. As described above, even when cellular phone 70 is kept in the folded state, the user can manipulate the reproduction operation portion, i.e., right button 72d and left button 72e as well as the volume control portion, i.e., up button 72b and down button 72c, and thereby can reproduce and record the audio data. Thereby, the operability and convenience are improved.

As described above, since cellular phone (70) is provided with the plurality of operation portions functioning as the decision buttons or directional buttons, various kinds of control, setting and change can be performed even when cellular phone (70) is in the folded state, and the operation of opening cellular phone (70) is not required. Further, cellular phone (70) can be used for various purposes while keeping it compact, i.e., in the folded state so that the convenience is improved. Since an arrangement of buttons is devised, the operability of the user is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cellular phone comprising:
   a first body;
   a second body;
   a coupling portion coupling said first body and said second body together, said coupling portion allowing folding of said first body and said second body with respect to each other;
   a first display portion arranged on a surface of said first body opposed to said second body in the folded state;
   an image taking portion fixedly arranged on a rear surface of said first body remote from the first display and capable of shooting while said cellular phone is folded;
   a second display portion, distinct from the first display portion, arranged on said rear surface and displaying an image with the image's top facing said coupling portion in the folded state;
   a plurality of keys arranged on said second body's surface and accepting input of numbers and letters, said plurality of keys facing said first display portion when said cellular phone is folded; and
   a plurality of operation portions accepting an input of operation instructions while said cellular phone is folded, said plurality of operation portions including a first operation portion and a second operation portion, said first operation portion and said second operation portion being associated with a plurality of functions performed by said cellular phone; wherein
   operation modes of said cellular phone include a first mode and a second mode,
   when said first operation portion is pressed for a predetermined time in said first mode, the operation mode of said cellular phone is changed from said first mode to said second mode and said second operation portion is associated with functions of said plurality of functions, said associated function is different from the function associated with said second operation portion in said first mode.

2. The cellular phone according to claim 1, wherein the other function different from said function associated for said first mode includes a function for playing audio.

3. The cellular phone according to claim 1, further comprising control portion controlling a display function of said cellular phone, wherein said control portion outputs an inversion control signal for turning an image upside down.

4. The cellular phone according to claim 3, further comprising inversion processing portion processing an image data based on the absence or presence of said inversion control signal to output the image data, wherein said inversion processing portion generates data to display half-rotated image of the image corresponding to the input image data if said inversion processing portion receives said inversion control signal, and said inversion processing portion outputs the input image data without processing the data if said inversion processing portion does not receive said inversion control signal.

5. The cellular phone according to claim 1, wherein said first mode is a shooting mode, and said second mode is a normal mode.

6. The cellular phone according to claim 1, wherein said plurality of operation portions include an operation button for operating display by said second display portion.

7. The cellular phone according to claim 1, wherein said plurality of operation portions function as a control button for controlling shooting conditions and an operation button for controlling display by said second display portion.

8. The cellular phone according to claim 1, further comprising an illumination portion emitting light, said illumination portion being arranged on the same surface as said image taking portion, wherein
   when said first operation portion or said second operation portion is pressed for a short time, said illumination portion emits light only during the pressing, and
   when said first operation portion or said second operation portion is continuously pressed for a time longer than a predetermined time, said illumination portion changes into a continuous-on mode.

9. The cellular phone according to claim 1, further comprising an illumination portion emitting light in a variable light color and arranged on the same surface as said image taking portion, wherein the light color changes when said first operation portion or said second operation portion is pressed for a short time, and said illumination portion changes into a continuous-on mode when said first operation portion or said second operation portion is continuously pressed for a time longer than a predetermined time.

10. The cellular phone according to claim 1, further comprising:
an illumination portion emitting light; and
an illumination light amount control portion, wherein
said plurality of operation portions include a light amount control button for controlling an amount of light of said illumination portion.

11. The cellular phone according to claim 1, further comprising:
an illumination portion having a plurality of LEDs (Light Emitting Diodes) of different colors; and
a light color changing portion changing the LEDs emitting light in said illumination portion, wherein said plurality of operation portions include light color changing buttons for changing the light color of said illumination portion.

12. The cellular phone according to claim 1, further comprising an incoming call record storing portion storing an incoming call record, wherein said first operation portion or said second operation portion accepts an operation instruction to change the incoming call displayed on said second display portion to another incoming call.

13. The cellular phone according to claim 1, further comprising a control portion displaying contents of a received mail on the second display portion, wherein when said first operation portion or said second operation portion accepts an operation instruction to select and display contents of another received mail.

14. The cellular phone according to claim 1, further comprising:
an antenna receiving television broadcast waves;
a television tuner connected to said antenna; and
a television signal processing portion processing a signal output from said television tuner, wherein said second display portion displays video signals subjected to signal processing by said television signal processing portion, and said plurality of operation portions include a channel selector button for changing a receive frequency of the television broadcast wave.

15. The cellular phone according to claim 1, further comprising:
an audio data storing portion storing audio data; and
an audio reproduction portion reproducing music based on the audio data, wherein when said first operation portion or said second operation portion accepts an operation instruction to reproduce the audio data stored in said audio data storing portion.

16. The cellular phone according to claim 1, further comprising a speaker, wherein said plurality of operation portions include a volume button for controlling a volume of the speaker.

17. The cellular phone according to claim 1, wherein said plurality of operation portions include:
a control item selecting portion accepting an operation instruction to select an item for control a setting of said cellular phone, and a control magnitude selecting portion accepting an operation instruction to select an amount of the control of said selected item.

18. The cellular phone according to claim 1, wherein said second display portion displays contents of a received mail, and said plurality of operation portions include a scroll button for longitudinally or laterally scrolling the contents of the mail displayed on said second display portion, and a selector button for selecting and displaying contents of another received mail.

19. The cellular phone according to claim 1, further comprising:
an antenna receiving television signal waves;
a television tuner connected to said antenna; and
a television signal processing portion processing a signal output from said television tuner, wherein said second display portion displays television pictures, said plurality of operation portions include a channel button for selecting television signal waves displayed by said second display portion and a volume button for controlling a sound volume.

20. The cellular phone according to claim 1, further comprising:
an audio data storing portion storing audio data; and
a reproducing portion reproducing audio based on the audio data, wherein said plurality of operation portions include a reproduction operation portion performing an operation of reproducing said audio data, and a volume button for controlling a sound volume.

21. The cellular phone according to claim 1, wherein said second display portion displays a control magnitude changeable by a user.

22. The cellular phone according to claim 1, wherein when said first operation portion or said second operation portion accepts operation instructions to control shooting conditions in said first mode.

23. The cellular phone according to claim 1, wherein when said first operation portion or said second operation portion accepts operation instructions to process taken images before saving the images in said first mode.

24. The cellular phone according to claim 1, wherein said plurality of operation portions include a first decision button, a second decision button and a third decision button.

25. The cellular phone according to claim 24, wherein said plurality of operation portions further include a fourth decision button and a fifth decision button.

26. The cellular phone according to claim 1, wherein said plurality of operation portions include a decision button, a right button and a left button.

27. The cellular phone according to claim 26, wherein said plurality of operation portions further include an up button, and a down button.

28. The cellular phone according to claim 1, wherein said image taking portion, said second display portion and said plurality of operation portions are arranged at the rear surface of said first body remote from said first display portion, and are arranged in this order starting from a position near said coupling portion.

29. The cellular phone according to claim 1, further comprising a plurality of numeric buttons and a plurality of operation buttons arranged on a surface of said second body opposed to said first body in the folded state.

* * * * *